US008073903B2

(12) United States Patent
Wood et al.

(10) Patent No.: US 8,073,903 B2
(45) Date of Patent: *Dec. 6, 2011

(54) MESSAGE ALERT BROADCAST BROKER SYSTEM AND METHOD

(75) Inventors: Mark Andrew Wood, Haslemere (GB); Kevin Russell Preston, Gwent (GB); Douglas Weiser, Port Richey, FL (US)

(73) Assignee: Envisionit, LLC, St. Charles, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/559,405

(22) Filed: Sep. 14, 2009

(65) Prior Publication Data

US 2010/0029245 A1    Feb. 4, 2010

Related U.S. Application Data

(63) Continuation of application No. 11/057,704, filed on Feb. 14, 2005, now Pat. No. 7,752,259.

(60) Provisional application No. 60/544,739, filed on Feb. 13, 2004.

(51) Int. Cl.
*G06F 15/16* (2006.01)
*H04M 11/04* (2006.01)

(52) U.S. Cl. ...... 709/203; 709/206; 709/207; 455/404.1

(58) Field of Classification Search .......... 709/204–207, 709/223–224; 455/403–404, 404.1
See application file for complete search history.

(56) References Cited

U.S. PATENT DOCUMENTS

| 4,415,771 | A | 11/1983 | Martinez |
| 4,887,308 | A | 12/1989 | Dutton |
| 5,278,539 | A | 1/1994 | Lauterbach et al. |
| 5,592,172 | A | 1/1997 | Bailey et al. |
| 6,021,177 | A | 2/2000 | Allport |

(Continued)

FOREIGN PATENT DOCUMENTS

EP    0915598    9/1999

(Continued)

OTHER PUBLICATIONS

3rd Generation Partnership Project TS 23.246, Release 6, Sep. 2004.

(Continued)

*Primary Examiner* — Joshua Joo
(74) *Attorney, Agent, or Firm* — Polster, Lieder, Woodruff & Lucchesi, L.C.

(57) ABSTRACT

A message alert broadcast broker and method for providing a broadcast message to a plurality of user devices located within a broadcast target area including a broadcast service bureau receiving from one of a plurality of coupled broadcast agent access systems providing a broadcast request from an originating broadcast agent associated one broadcast agent access system, the broadcast request including a broadcast agent identification, the geographically defined broadcast target area, a broadcast message, and a broadcast channel code, the broadcast service bureau verifying the broadcast request as a function of the broadcast agent identification including the authority of the originating broadcast agent to send the broadcast message to the broadcast target area using the broadcast channel code, the broadcast service bureau processing the verified broadcast request for transmission to one or more mobile telephone networks providing service to at least a portion of the broadcast target area of the broadcast request.

20 Claims, 11 Drawing Sheets

U.S. PATENT DOCUMENTS

| | | | |
|---|---|---|---|
| 6,084,510 A | 7/2000 | Lemelson et al. | |
| 6,112,075 A | 8/2000 | Weiser | |
| 6,121,885 A * | 9/2000 | Masone et al. | 340/628 |
| 6,161,016 A * | 12/2000 | Yarwood | 455/445 |
| 6,169,476 B1 | 1/2001 | Flanagan | |
| 6,219,696 B1 | 4/2001 | Wynblatt et al. | |
| 6,240,360 B1 | 5/2001 | Phelan | |
| 6,346,890 B1 | 2/2002 | Bellin | |
| 6,463,273 B1 | 10/2002 | Day | |
| 6,480,578 B1 | 11/2002 | Allport | |
| 6,490,525 B2 | 12/2002 | Baron, Sr. et al. | |
| 6,493,633 B2 | 12/2002 | Baron, Sr. et al. | |
| 6,526,268 B1 * | 2/2003 | Marrah et al. | 455/186.1 |
| 6,580,916 B1 | 6/2003 | Weisshaar et al. | |
| 6,650,902 B1 | 11/2003 | Richton | |
| 6,683,526 B2 | 1/2004 | Bellin | |
| 6,721,542 B1 | 4/2004 | Anttila et al. | |
| 6,745,021 B1 * | 6/2004 | Stevens | 455/404.1 |
| 6,751,455 B1 | 6/2004 | Acampora | |
| 6,753,784 B1 | 6/2004 | Sznaider et al. | |
| 6,766,163 B1 | 7/2004 | Sharma | |
| 6,785,551 B1 | 8/2004 | Richard | |
| 6,867,688 B2 | 3/2005 | Lamb | |
| 6,882,837 B2 | 4/2005 | Fernandez et al. | |
| 6,947,754 B2 | 9/2005 | Ogasawara | |
| 7,049,971 B2 * | 5/2006 | Guillory | 340/601 |
| 7,184,744 B1 * | 2/2007 | Schnabel | 455/404.2 |
| 7,194,249 B2 * | 3/2007 | Phillips et al. | 455/404.1 |
| 2002/0095333 A1 | 7/2002 | Jokinen et al. | |
| 2002/0107016 A1 | 8/2002 | Hanley | |
| 2002/0124252 A1 | 9/2002 | Schafer et al. | |
| 2003/0026240 A1 | 2/2003 | Eyuboglu et al. | |
| 2003/0134622 A1 | 7/2003 | Hsu et al. | |
| 2003/0134651 A1 | 7/2003 | Hsu | |
| 2003/0137415 A1 | 7/2003 | Thomson | |
| 2003/0143974 A1 * | 7/2003 | Navarro | 455/404 |
| 2003/0145064 A1 | 7/2003 | Hsu et al. | |
| 2003/0197615 A1 | 10/2003 | Roche et al. | |
| 2004/0034689 A1 * | 2/2004 | Kacalek et al. | 709/206 |
| 2004/0103158 A1 * | 5/2004 | Vella et al. | 709/206 |
| 2004/0150518 A1 | 8/2004 | Phillips et al. | |
| 2004/0152493 A1 | 8/2004 | Phillips et al. | |
| 2004/0203562 A1 * | 10/2004 | Kolsrud | 455/404.1 |
| 2004/0247086 A1 | 12/2004 | Menard et al. | |
| 2004/0259568 A1 * | 12/2004 | Patel | 455/456.1 |
| 2005/0030977 A1 | 2/2005 | Casey et al. | |
| 2005/0096065 A1 | 5/2005 | Fleischman | |
| 2005/0101286 A1 * | 5/2005 | Macolly et al. | 455/403 |
| 2005/0162267 A1 | 7/2005 | Khandelwal et al. | |
| 2005/0203892 A1 * | 9/2005 | Wesley et al. | 707/3 |
| 2005/0261012 A1 | 11/2005 | Weiser | |
| 2006/0040639 A1 * | 2/2006 | Karl et al. | 455/404.1 |
| 2007/0129053 A1 * | 6/2007 | Phillips et al. | 455/404.1 |

FOREIGN PATENT DOCUMENTS

| | | | |
|---|---|---|---|
| EP | 1032148 | | 8/2000 |
| EP | 1032148 | A2 | 8/2000 |
| EP | 1071296 | | 1/2001 |
| EP | 1515512 | | 3/2005 |
| JP | 09098140 | | 4/1997 |
| JP | 10336127 | | 12/1998 |
| JP | 441719 | | 9/1999 |
| JP | 2000165826 | | 6/2000 |
| JP | 441720 | | 8/2000 |
| JP | 2000244427 | | 9/2000 |
| WO | 9605678 | | 2/1996 |
| WO | 9849661 | | 11/1998 |
| WO | 0030379 | | 5/2000 |
| WO | 0145061 | | 6/2001 |
| WO | 0157724 | | 9/2001 |
| WO | 0189150 | | 11/2001 |
| WO | 03071392 | | 8/2003 |
| WO | 03077063 | | 9/2003 |
| WO | 2005/079421 | A2 | 9/2005 |
| WO | 2005079421 | | 9/2005 |

OTHER PUBLICATIONS

Bharat Sanchar Nigam Limited, "Value Added Services in GSM", Engineering Instruction, May 4, 2005; http://www.bsnl.co.in/service/mobile_voice_based_service.htm.

British Parliament Debates CellAlert Service for the UK, May 13, 2003, www.ceasa.us/news.htm.

Canadian Contract No. 5007441, Jul. 23, 2003; http://72.14.203.104/search?q=cache:piSqEswBv74J:strategis.ic.gc.ca/epic/internet/inet-td.

Canadians want Emergency-Location Services, by Dave Ebner, Apr. 11, 2003, www.ceasa.us/news.htm.

Ceasa, Cell Alert System Via Cell Broadcast, Wood, Sep. 2005, www.eglobalconf.net/speeches/MarkWood.ppt.

Ceasa; News and Events, "News", Jan. 14, 2005-Jun. 2005, http://www.ceasa-international.org/news.html.

Ceasa, "Text Message Broadcasts Could Provide Disaster Alerts" Jul. 28, 2005, http://ceasa-international.com/usa/index2.php?option=comcontent&task=view&id=1<e.

Ceasa International, "Public Warnings Via Cell Broadcast", Wood and Weiser, May 24, 2005, http://www.ceasa-int.org.

Ceasa International, "Welcome to CEASa USA", Ceasa Admin, Jun. 12, 2004, http://ceasa-international.com.

Cellular Emergency Alert Services Association, Feb. 21, 2003, CellAlert Services Corporate Structure, www.ceasa.us/news.htm.

Chinese Office Action, 2009.

CSEC "Wireless Implementation & Maintenance, Service Notification & Testing Notification Policies and Procedures", Apr. 19, 2002, http://www.911.state.tx.us/files/pdfs/resources/call_take.xls.

Deaf Today, Disability Group Backs Cingular/AWS Merger, Silva, Jun. 4, 2004, http://www.deaftoday.com/news/archives/004848.html.

Engadget, "Dutch Testing Geo-Targeted SMS Emergency Broadcast System", Ricker, Oct. 8, 2005, http://www.engadget.com/entry/1234000590062252.

ETSI TS 123.246, Universal Mobile Telecommunications Systems (UMTS); Multimedia Broadcast/Multicast Service (MBMS); Architecture and functional description (3GPP TS 23.246 version 6.6.0 Release 6) (Mar. 2005).

Global Amateur Radio Emergency Communications, Tampere, Finland, Jun. 13-14, 2005, "What is 'Cell Broadcasting' and Why do I care, as a HAM?", Wood, www.rientola.fi/oh3ag/garec/documents/Cellalert.ppt.

International Search Report, date of mailing Jul. 17, 2006 from the International Searching Authority.

International Telecommunication Union, "Cell Broadcast Broker System" M. Wood, Cell Alert Services Corp., Feb. 18, 2003, http://www.itu.int/itudoc/itu-t/workshop/ets/isd3-001.html.

Messaging Network, Bercut Limited, "Broadcast for the Masses", Sergey Ermilov, Mar. 2, 2005, http://www.bercut.biz.

MobileIN.com Perspective, "Cell Broadcasting Technical Primer", Wood, Sep. 2005, http://www.mobilein.com/Perspectives/Authors/CB_Primer.htm.

MobileIN.com Perspective, "History and Importance of Cell Broadcast", Wood, Sep. 2005, http://www.mobilein.com/Perspectives/Authors/CB_HistoryImportance.htm.

News from Senator John Edwards, North Carolina, Apr. 3, 2003, Senate Okays Edwards Emergency Warning Bill, www.ceasa.us/news.htm.

Newscientist.com, "Text Message Broadcasts Could Provide Disaster Alerts", Jan. 6, 2005, http://www.newscientist.com/article.ns?id=dn6852.

OCG-EMTEL Archives, "Cell Broadcast Public Demonstration in USA Successful", Wood, Sep. 19, 2004, http://list.etsi.fr/scripts/wa.exe?A2=ind0409&L=ocg_emtel&T=O&F=&S=&P=693.

RCR, Cell-Broadcast Service Gets Second Look, Jeffrey Silva, Nov. 10, 2003, www.ceasa.us/news.htm.

Recommendation 12 (WTDC-02), The World Telecommunication Development Conference (Istanbul 2002).

SMS News, "Text Message Broadcasts Could Provide Disaster Alerts", Jan. 7, 2005, http://www.sendsmsnow.com/newspage.php?id=44.

Stanford University, EE179 Introduction to Communications, Professor Andrea Goldsmith, Winter 2005, http://www.stanford.edu/class/ee179.

TeliaSonera, "Mobile Broadcast/Multicast Service (MBMS)", MediaLab, Aug. 2004, www.medialab.sonera.fi.

Text Message Warns of 'killer flu' hot spots, Apr. 20, 2003, www.ceasa.us/news.htm.

The Cellular-Emergency Alert Services Association Policy Statement, Aug. 5, 2002, http://www.ceasa.us/news.htm.

The Wall Street Journal Online, Local Governments Look to Cellphone-Based Alerts, Carl Bialik, Jun. 12, 2003, www.ceasa.us/news.htm.

Foreign Associate letter of Notification of the First Office Action dated Oct. 12, 2010 from State Intellectual Property Office of the People's Republic of China; Application Serial No. 200680051671.4 (letter dated Nov. 2, 2010).

* cited by examiner

CBB Admission Control Algorithm

MESSAGE ALERT BROADCAST BROKER SYSTEM AND METHOD

CROSS REFERENCE TO RELATED APPLICATIONS

This application is a continuation of U.S. application Ser. No. 11/057,704, filed Feb. 14, 2005, which is based on Provisional U.S. Application Ser. No. 60/544,739, filed Feb. 13, 2004, the entire disclosures of which are incorporated herein by reference.

FIELD

The present disclosure relates to message broadcast systems and in particular location-specific message broadcasting aggregator and gateways.

BACKGROUND

With the events of 9/11, there has been increased concern with the ability of present systems for providing public service broadcasting of messages and warnings to the public. Existing public service warning systems are antiquated and provide only limited access to the public who may be in need of knowing of potential emergencies or danger. Additionally, existing systems do not provide for location-based notification or broadcasting.

As such, there is a need for an improved method and system for providing timely information to the public related to potential hazards affecting them. One suggested solution is the utilization of the subscription-based Short Message Service (SMS) messaging capability for mass messaging using mobile telephones and compatible devices. However, SMS systems and technology have significant technical limitations and experience with such systems has been disappointing due to significant delays in the delivery of SMS messages and negative impacts to the networks due to congestion.

Short Message Service (SMS) is only offered or available on a limited basis. This is due to the limited technical and network support for the service and is also due to the service being offered by Mobile Service Providers and wireless network providers on a subscription basis. As such, use of the SMS service capability for emergency broadcasting is very limited.

Additionally, the use of SMS technology for broadcasting requires enormous network infrastructure utilization. A telecommunication system can suffer from congestion, not only in its voice traffic channels, but also in its narrow-band data channels as are used for the SMS service. To send an SMS message, network components are utilized to provide an SMS message call set up for each individual SMS message recipient. In order to send a single SMS message, all SMS message call processing procedures have to be repeated for each and every message, one by one, for all intended recipients. A single SMS message requires signaling and processor capacity and utilization similar to that required to establish a voice call. As such, the impact on network resources for broadcasting SMS messages is the same as having thousands of phone users attempt to initiate a voice call at the same time. Telecommunication networks are not designed or deployed to handle such high levels of simultaneous call attempts.

When an SMS message is transmitted, the SMS message is signaled to an SMS center of the telecommunication service provider. The SMS center acknowledges each and every requested SMS message individually and attempts to deliver the SMS message through an interrogation of the Home Location Register (HLR) of the telecommunication service.

An HLR is a data base which registers or keeps track of the presence of a mobile unit user within the HLR's defined serving network. The HLR queries the database and determines whether the intended SMS message recipient is currently attached to the network and if so, to which network switch the user is attached. The HLR is queried using the telecommunication signaling network.

If an intended user is located or attached to a switch in the telecommunication service provider's network, the particular network switch is signaled over the telecommunications signaling network to set up the SMS message call. That serving network switch of the mobile carrier initiates a query or message attempt to every cell in the location area where the intended user's mobile unit was last known to be operating. If the intended recipient is located in the particular cell area, the mobile unit is paged. As such, potentially thousand of cells are queried in order to determine the presence of an intended mobile unit. Each queried cell requires paging and calling capacity resources for each mobile unit which is attempted to be paged. In some cases, if the mobile unit does not reply, the whole Mobile Service Carrier (MSC) area is paged which in many instances requires the paging of several thousands of cells.

When the mobile unit replies by sending an access burst to the cell transceiver currently serving the mobile unit, the cell site allocates a stand-alone dedicated control channel (SD-CCH) to perform SMS call set up with the mobile unit. Next, a cipher key is sent by the Home Location Register (HLR)/Authentication Center (AUC) to the mobile unit, assuming that the mobile unit had previously activated the ciphering of the channel. Once the cipher key is successfully received and acknowledged, the SMS message is sent over the control channel to the mobile unit. The SMS message transmission utilizes about 5 seconds of control channel time per SMS message.

If, however, the intended recipient is not located in the home serving area of the HLR, then signaling message is sent to the serving mobile network's Visitor Location Register (VLR). The VLR registers and tracks mobile unit users who are outside of their home location. In that case, the VLR is queried via the signaling network to verify that the user is currently attached to the remote switch.

Each SMS message is a narrow-cast message in that each message is generated and transmitted via the SMS Center to a particular telecommunication user or unit. The SMS message is delivered, as discussed above, to the intended recipient by capable networks wherever the intended recipient is located, independent of geographic area or location.

As such, SMS messaging for emergency-based messaging requires that SMS messages be created and sent to each mobile unit even though the particular user phone is not located in the particular geographic area in which the emergency is located. SMS service is not capable of position-specific messaging.

Additionally, SMS messaging requires considerable call processing load on the telecommunication system and infrastructure considering that the above process is multiplied by the demand of thousands or tens of thousands of SMS call set up requests at the same time. The potential initiation of broadcast SMS volumes will not only affect network resources for SMS messaging, but also negatively affect ability of the telecommunication networks to set up and support voice traffic during any period of message broadcasting as these resources are shared by both services.

As a further example of the limitation of existing solutions to message broadcasting, the well deployed Global Standard for Mobile Communications (GSM) system typically deploys in a single GSM cell several transceivers. A typical GSM cell configuration includes between 6 and 12 transceivers. Each such transceiver includes 8-timeslots. Each timeslot supports a single phone call.

In such an arrangement, one of the transceivers is selected to be the SMS carrier. The SMS carrier transceiver is arranged differently, having one timeslot dedicated to broadcast SMS messages and paging and another one which is utilized to from 8 control channels which are referred to as Stand-Alone Dedicated Control Channels (SDCCH). The SDCCH carry out control and call set-up functions and carry the SMS traffic which is not normally handled by the traffic channels on the other timeslots.

However, in this prior art system, SMS and Wireless Access Protocol (WAP) messaging utilize capacity on these channels making them unavailable for other purposes such as voice call set up. Additionally, each of the SDCCH channels can only handle a limited number of SMS and/or paging calls. As such, during heavy messaging, the related high volumes of messaging traffic may have a negative affect on other services including the set up of voice calls.

To compensate for these and other SMS messaging limitations, dynamic channel allocation was developed. Dynamic channel allocation utilizes an additional traffic channel which is converted into another 8 control channels for the duration of the peak SMS or paging loads. However, this results in the loss of the traffic channel for voice communications.

Further strategies have included the immediate assignment to a traffic channel. In this system, when a voice call is attempted, the voice call is sent to a traffic channel directly where signaling will be performed on the traffic channel. This, however, occupies the traffic channel for a longer time than would otherwise be the case. There is a limit on the number of traffic channels that can utilize this feature. In most cases, only one traffic channel is converted thereby only limited the solution to 8 new SDCCH channels. The impact of call failure due to control channel depends on the traffic capacity of the cell. In high density cells, when a large quantity of SMS messaging traffic is offered, congestion occurs due to the each cell having over one hundred traffic channels within the cell.

In operation, the telecommunication service provider addresses this limitation by throttling the SMS messaging rate so that it is manageable and does not create congestion problems. However, such message load management negatively impacts the opportunity for using SMS messaging for broadcasting emergency messages to users of those networks. Throttling often significantly delays the delivery of the SMS message, even though it's timing delivery in an emergency is critical. Furthermore, if a message fails to be delivered, the SMS center repeatedly attempts to deliver the message, thereby causing further congestion and message backlog.

Additionally, as discussed SMS messaging is not location based and does not send messages to intended recipients located within a defined geographic location. Since many telecommunication users will be messages independent of their location, many of the generated SMS messages are sent to users who are not in the intended area.

In the alternative, some next-generation phone systems include a basic cell-based broadcasting capability, e.g., GMS, CDMA and UMTS. In such systems, the cell broadcasting capability allocates a portion of each timeslot bandwidth capacity in each cell as a reserved broadcast timeslot. While the cell broadcast capability in included in many new equipment being deployed, cell broadcasting systems and services have not been developed which effectively utilize the technology.

SUMMARY

The embodiments of the present disclosure provide one or more improvements over the prior art.

In one aspect, a message alert broadcast broker for providing a broadcast message to a plurality of user devices located within a broadcast target area, the system including a broadcast service bureau communicatively coupled for receiving from one of a plurality of coupled broadcast agent access systems providing a broadcast request from an originating broadcast agent associated one broadcast agent access system, the broadcast request including a broadcast agent identification, the geographically defined broadcast target area, a broadcast message, and a broadcast channel code, the broadcast service bureau configured for verifying the broadcast request as a function of the broadcast agent identification including the authority of the originating broadcast agent to send the broadcast message to the broadcast target area using the broadcast channel code, the broadcast service bureau processing the verified broadcast request for transmission to one or more mobile telephone networks providing service to at least a portion of the broadcast target area of the broadcast request.

In another aspect, a public service message broadcast service bureau system providing a broadcast message to a network transmission device serving a broadcast target area, the system including a webpage server configured for receiving broadcast agent input from a broadcast agent including a broadcast request having a geographically defined broadcast target area defined as a subset of a broadcast transmission serving area, the broadcast message, and at least one broadcast channel code; and a computer hosting the webpage over the first communication interface, said computer receiving the broadcast agent input, verifying an authority of the particular broadcast agent to transmit the broadcast message to the broadcast target area and transmitting over the second communication interface the broadcast request to one or more carrier broadcast centers serving one or more local broadcast transmission systems, the carrier broadcast centers receiving the broadcast request, converting the broadcast target area to network addresses of network transmission devices serving the broadcast target area including determining only those particular network transmission devices serving at least a portion of the broadcast target area, and identifying the network addresses for each particular network transmission device and transmitting the broadcast message to the network addresses of the particular network transmission devices for transmission by the particular network transmission devices over broadcast channels associated with the broadcast channel codes in the broadcast request.

Yet in another aspect, a method of public service broadcast messaging to a broadcast target area, the method including hosting a broadcast agent webpage; receiving a broadcast request including a geographically defined broadcast target area, a broadcast message and one or more broadcast channel codes from the broadcast agent webpage; verifying an authority of a broadcast agent accessing the broadcast agent webpage and generating the broadcast message, the verifying a broadcast message jurisdiction of the broadcast agent includes the defined broadcast target area; determining which network providers have networks that provide service to at least a portion of the broadcast target area; converting the broadcast target area to network addresses of one or more network transmission devices for one or more of the determined network providers, said converting including determining the network transmission devices providing transmission service to at least a portion of the broadcast target area and identifying the network address for each determined network transmission device; and transmitting the broadcast message to the network addresses of the determined network transmission devices of the associated network providers for transmission of the broadcast message over broadcast channels associated with the broadcast channel code to user receiving devices geographically located within the transmission service area and that are configured for receiving messages on the associated broadcast channels.

Further aspects of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings.

Corresponding reference characters indicate corresponding parts throughout the several views of the drawings.

DETAILED DESCRIPTION

Figure 1:
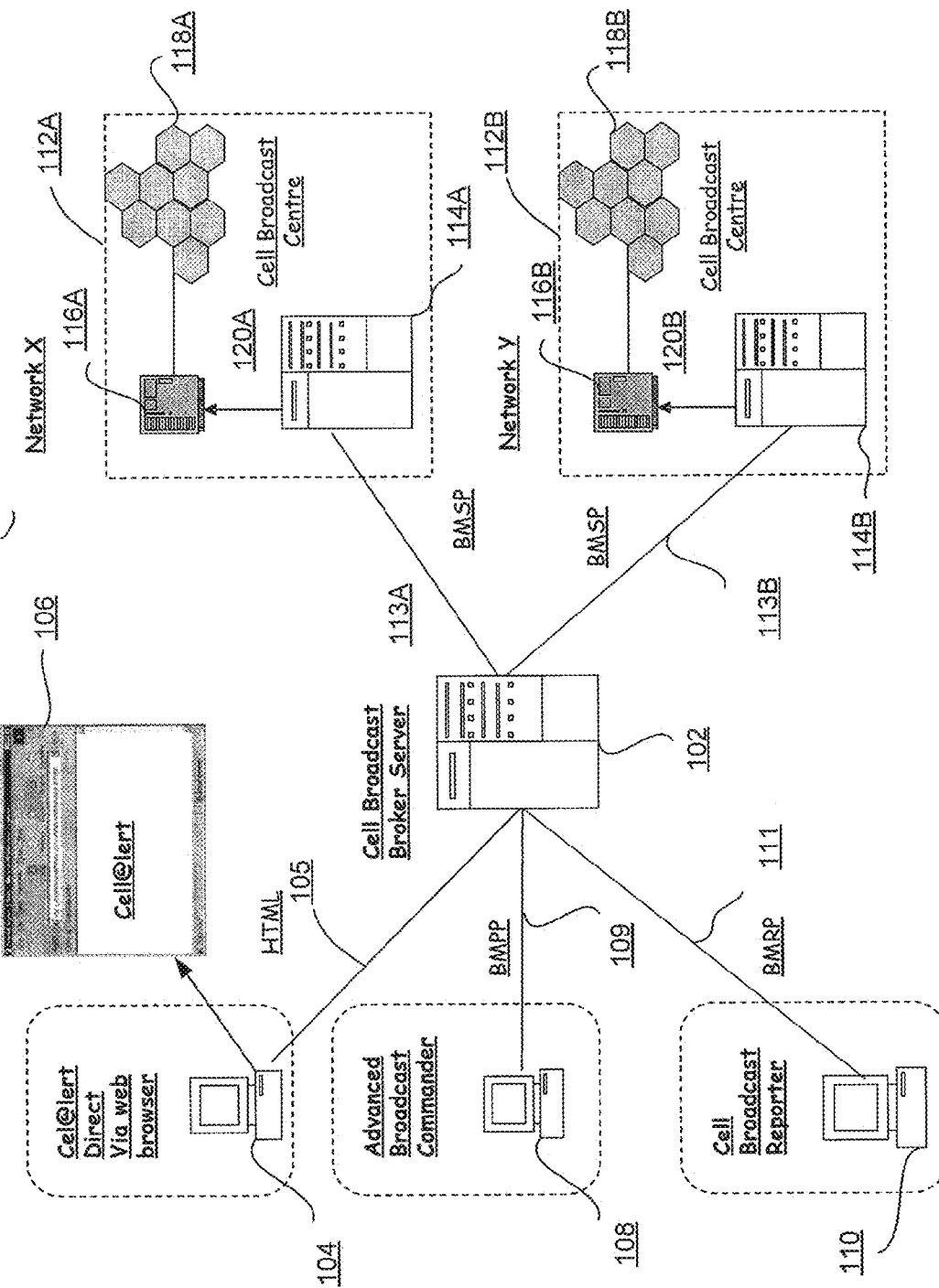
FIG. 1 is a functional block diagram of a public service message location broadcast system according to one embodiment.
Figure 2:
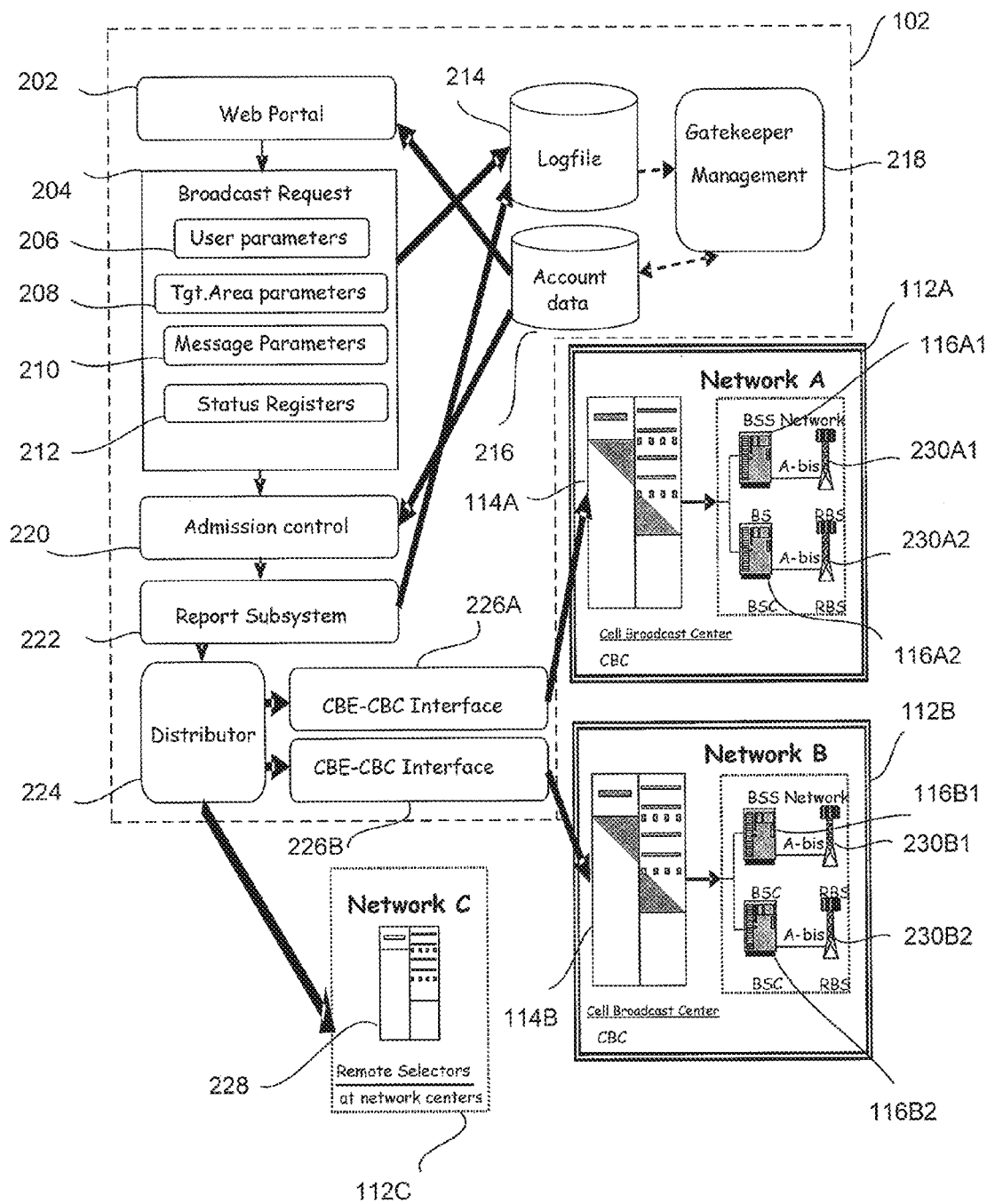
FIG. 2 is a second functional block diagram of a public service message location broadcast system according to one embodiment.

The following description is merely exemplary in nature and is in no way intended to limit the disclosure, its application, or uses.

The public service message location broadcasting system (PLBS) according to one or more embodiments provide for an improved system and method for public service broadcast messaging. A public service message location broadcasting system (PLBS) operator provides a Broadcast Agent Web Portal or Webpage or other similar GUI interface, implementation and maintenance of the networks' cell-broadcast messaging components, networks and platforms, administration and operation of the public service message location broadcasting system, and interfaces to local telecommunication service providers including mobile unit service providers.

According to one embodiment in the event of a serious public emergency, a short text message is sent over the location broadcast channel. A mobile unit or Broadcast Agent phone which is configured to receive location broadcast messages, which is in the idle mode and which is located in the predefined cell receives the broadcast message and displays the message on its screen.

Location broadcasting is transmitted from the predefined cell in a downlink only mode and therefore does not require functionality or network resources from the mobile services provider or from their any portion of the mobile service provider's mobility management resources, e.g., HLR, VLR, etc.

Public service message location broadcasting system provides for the simultaneous sending of public service messages to millions of subscribers with less impact on the supporting networks than a single SMS-message. As such, minimal to no network congestion will result.

A public service message location broadcasting system (PLBS) receives emergency or public service messaging and identification of the target broadcast area from public service or government entities. The PLBS provides location broadcast message enablement, security and multi-carrier interoperability and connectivity to the telecommunication service providers offering services within the target broadcast area.

A public service message location broadcasting system and method according to one or more embodiments provides for the development, transmission, delivery and display of a message that is an official government-to-citizen information broadcast to all compatible telecommunication receiving devices in, or entering, an predefined at-risk geographic location or area.

The PLBS system sends any public service or emergency information associated with any event, determined by authorized messaging entities that may affect public safety. These include utility outages, missing child alerts, severe weather warnings, flood warnings, and terrorist threat warnings. The messages are broadcast by public service message location broadcasting systems participating with local telecommunication networks.

Unlike other emergency messaging services that require the recipient's identity, a predetermined fixed delivery location, and usually the payment of a service fee, public service message location broadcasting system uses broadcast messaging technology to reach an unlimited number of people in real time, with no pre-event subscriber action required.

Public service message location broadcasting system uses cell-broadcast SMS (C-BSMS) technology to provide a message or alert to a single cell geographic location, a neighborhood, a city, or an entire nation with minimal impact to the hosting telecommunication networks.

Local telecommunications service providers such as mobile or cellular telephone service providers provide the local infrastructure and deployed technologies to enable the service message location broadcasting system to transmit public messages in a timely manner to the public that may be at risk using a standard and commonplace mobile telephone unit.

The public service message location broadcast system and methods described herein provide the functions and steps necessary to ensure that the Broadcast Agents are authorized to send the requested broadcast messages to the defined broadcast target area. The PLBS configuration described herein provide for internal controls for insuring that the network and components are secure and that messages are authorized prior to transmittal. The public service message location broadcast system provides the interface to the Broadcast Agents to ensure simple and timely definition of the broadcast target area, the message and the authentication of the Broadcast Agent. The public service message location broadcast system also provides the interconnectivity and functionality for interface or the number telecommunication service providers which provide for the delivery of the broadcast message to the broadcast target area.

The public service message location broadcasting system consists of five parts:
1. Public Service Location Broadcast Service Bureau
2. Broadcast Agent Terminal/Web Portal/Web Page
3. Public Service Broadcast Controller
4. Carrier Broadcast Center
5. Public Service Location Broadcast Reporter The Public Service Location Broadcast Service Bureau (PLB-SB) is located at a PLBS Operators location which is preferably secure. The PLBS-SB ensures the authenticity of the message and the authority of the sender to create such a message. Administrative Operators establish the User Profile in the Administration Subsystem to control Broadcast Agent rights and privileges. The signal from the Broadcast Agent Terminal, for example, at the police station, to the PLBS-SB, would only indicate the geographical area to be covered, plus the message. PLBS-SB then sends the broadcast request signal to the Carrier Broadcast Center at the office of each local carrier concerned.

PLBS-SB may also perform a billing gateway administrative function as may be required to allocate costs. PLBS-SB can utilize stored location broadcast messaging data and may have access, in one embodiment, to the geographical coverage requested by the Public Service Broadcast Agent. PLBS-SB may be configured to determined or calculate population density of the broadcast area. PLBS-SB may also manage customer account data, authentication, security, and administration and application of restrictions on a customer, jurisdiction, or Broadcast Agent.

For each account, a Broadcast Agent Administrator is appointed. A person of whose authority is recognized, such as a police chief or city manager would be suitable for such a role, though he may likely delegate this to someone in the Information Technology services group. The Broadcast Agent Administrator (or his delegate) has under his control several Broadcast Agent accounts, which have authority under him, but on no account greater. For example, the jurisdiction of a Broadcast Agent is within that of a Broadcast Agent Administrator.

Using the PLBS-SB, an Administrative Operator checks and/or verifies the authenticity of the Broadcast Agent Administrator and defines or validates the jurisdictional area of the Broadcast Agent's organization. The Administrative Operator administers customer and agent profiles within the PLBS Service Bureau System. The Administrative Operator has secure access for administering the operational and administrative data and profiles for operation of the PLBS-SB. Best practices and Memoranda of Understanding (MOU) are defined by government agencies and/or local carriers. For example, a Coast Guard commander may have access only to costal areas, though the area would be very large. In another example, a River Authority manager would have a guideline indicating that he could warn of imminent flooding, but not urge people to shower less. The river authority Jurisdiction may include only rivers, waterways and flood plains.

Any data and/or factor may be input to the PLBS-SB by the Administrative Operator and used by the PLBS-SB for system operation. Each Broadcast Agent Administrator has an account to which the Broadcast Agent belongs. The account is updated to indicate usage accumulated by the Broadcast Agent Administrator. Factors and data recorded include:
1. Language or Languages for warnings
2. Broadcast Agent Administrator account holder contact details
3. Total number of messages broadcast
4. Total Pops reached
5. Mess-Pops figure (number of messages times the pops reached)
6. Log, (Each broadcast is recorded on the account for later review)
7. Date of expiry of contract
8. Which networks are permitted for this Broadcast Agent Administrator?
9. Which channel numbers are allowed?
10. Message, Footprint and Broadcast libraries
11. Jurisdictional limits
12. Pop limits
13. Message length limits
14. Language for web portal
15. Report parameters and addresses
16. Admissions rules and operational events such as denials of service.

In some circumstances a report in the form of an e-mail or web-page may be sent or made available to the Administrative Operator and/or the Broadcast Agent Administrator. Such a report may include a warning that the account credit is about to expire, or the status of an account or activity. Such reports may be defined or requested or provided one a regular or specified interval.

Service may be automatically denied to a Broadcast Agent or Broadcast Agent Administrator who has exceeded his quota.

In other cases information about account status may be signaled to the Broadcast Agent at log on and when proposing messages. This may cause the Broadcast Agent to think again about conserving his quota if near to his limit.

The PLBS-SB may also define broadcast message jurisdiction is a geographical area for a particular Broadcast Agent Administrator and associated Broadcast Agents. Broadcast Message Jurisdiction may define any number of factors, data, or services. A first is definition or allocation of geographic territory or areas to be accessed or displayed in map format to the Broadcast Agents of the Broadcast Agent Administrator. Additional, all or a portion of the Broadcast Message Jurisdiction may be enabled or disabled for defining one or more broadcast message target areas or "Broadcast Target Area/Footprints" in which a public service broadcast message is to be sent. A second is the identification and specification of carrier or telecommunication local carriers that will be included in the public service location broadcast message messages originated by the particular Broadcast Agent Administrator or Broadcast Agent. This may also include defining one or more networks, network components (such as Carrier Broadcast Center or network switching centers) or sub-networks to be provided the broadcast messages.

The Broadcast Agent Administrator is capable of setting further restrictions or rules related to its Broadcast Message Jurisdiction and one or more Broadcast Agents under its control or within its Broadcast Message Jurisdiction. For example, it may establish differ levels of authority for various personnel within a police department or fire department or allocation sub-areas or sub-jurisdictions based on police or fire department sub-boundaries.

For each Broadcast Agent Administrator, the Broadcast Target Area/Footprint Library is generated and shared among the Broadcast Agents. However in some cases, the Broadcast Agent Administrator may wish to pre-define Broadcast Target Area/Footprints on the basis of existing agreements. For example, these may include tornado watch boxes or mandated warning zones around a chemical plant.

In this case, the Broadcast Agent Administrator has the option to allow some Broadcast Agents only to access the Broadcast Target Area/Footprint library, or to be able to use the library and the map tool. Other Broadcast Agents may have the authority to create new Broadcast Target Area/Footprints and store them in the library.

In some cases, the Broadcast Target Area/Footprint area may be complex. An advanced Footprint Library feature will enable the Broadcast Agent to pre-define areas to be covered, and store them in a library of Broadcast Target Area/Footprints specific to that Broadcast Agent. For example, the flood plain area of a river may be complex to define with a simple mouse click. You would want to get that done ahead of time, then call it back quickly when an urgent message is imminent. In another case, a tornado warning box is pre-defined by political means and may be easier to refer to as such.

This feature may also be required if a particular Broadcast Agent only has authority to cover, for example, major highways or coastal areas such as beaches. These can be pre defined by an Administrative Operator and then locked so that the Broadcast Agent has limited authority as to the Broadcast Target Area/Footprint's area.

There is no limit on how many users one message can reach and in theory an authorized operator may send the message to everyone in the country at the same time. Since most authority is relatively limited, the account may be set established on a per Broadcast Agent basis thereby determining the area to be addressed by one message. An Admission Control feature checks new message for a pop figure before agreeing to proceed. If not, the message is declined and the Broadcast Agent receives a message and report with an explanation. To continue, the Broadcast Agent can either set the area to one less ambitious, or request authorization from another Broadcast Agent with more pop authority. The pop figure may also be used to generate usage statistics which the administration system would record for each Broadcast Agent. If a Broadcast Agent has exceeded the agreed limit, the account can be closed and an e-mail sent to the Broadcast Agent Administrator explaining this.

Control of Pops is also provided for the local carriers because the spacing of Radio Base Stations when very closely to population density. A dense urban area may be covered by more cells than the same corresponding area in a rural environment. From a signaling point of view more cells are signaled for an area in the city that in the country. Therefore the relationship between pops and network load is a valid one. For example, the number of messages times the population they have targeted [Mess*Pops] is one possible strategy for working out billing, since we have pop figures directly from the reports generated by account administration.

A Broadcast message may consist of 15 82-character messages linked together. The standard default maximum size of a message may be that used by second generation GSM systems, which is 93 characters, or 82 octets of data. However, in practice each message should be less in order to support multiple language messages and for practical application reasons. The Broadcast Agent Administrator may set limits on the length of an individual message. The Broadcast Agent Administrator may also set a limit on how much in total has been sent by all of the Broadcast Agents within his control. An extended-message button on the advanced message dialogue box provides for setting further message contents as required. For future systems, messages may include multimedia messages such as photographs or maps. In such a case, a multimedia facility dialogue box is utilized.

The Broadcast Agent Administrator may also pre-define set messages in the message library, so that some accounts may broadcast only these messages. Others may be able to create their own and store them in the library. Past messages are also stored in the message library for later recall or repetition. Either from the advanced menu or from an advanced button on the quick message box, the Broadcast Agent can select the advanced message panel. Here the Broadcast Agent has many more options to control messages. For example, a particular message may be used frequently, or the precise wording of a message may have been agreed at higher political level in advance and only this wording is agreed. In such a case, the Broadcast Agent selects from a Message Library of standard messages available to this Broadcast Agent. The system stores past messages and is capable of retrieving them for re-transmission.

The system provides for the ability to repeat a message if the emergency continues for a long time, as the location broadcast message will only last for a limited period and be me repeated. In other cases, the broadcast event may be triggered by an automatic machine such as a water level device. If so the event triggers the pre-defined message as set up by agreements ahead of time between the Broadcast Agent Administrator for that organization and the Administrative Operator who administers the accounts on the PLBS-SB in accordance with guidelines agreed with government authorities and local carriers.

A Broadcast Request includes both the message and the Broadcast Target Area/Footprint together. In some cases both the Broadcast Target Area/Footprint and the message may be pre defined by one group of Broadcast Agents giving other Broadcast Agents only the choice as to when to send the message. The Broadcast library also keeps copies of previously sent messages, and their Broadcast Target Area/Footprints, for fast recall and for internal management reasons within the Broadcast Agent organization.

The system also provides for the broadcasting of public messages that are in several languages. In this case the Broadcast Agent will not be allowed to proceed until messages in the other languages have been compiled. Alternatively the broadcast message may be sent in each language as each is entered. Otherwise translation servers can be signaled for a best effort translation. The account administration parameters will determine this.

In many cases, users may be travelers from an area where a different language is the primary language. If so, by keeping separate channels for warnings in each language, the user may receive a message in his own language. This may also be required in multilingual countries or portions of countries such as along a border. The PLBS Operator or Broadcast Agent Administrator may also be required by government authorities to send messages in more than one language. If so, the Administration system reminds the Broadcast Agent to open up messages for all the languages required. It will then link them together so that when one is recalled, they are all recalled together and treated as if the same message.

The Broadcast Agent may not be able to read and write the message in the other language, for example, he may not read Chinese or Arabic. In this case, he can go to the library of messages, which will automatically match the other language message. However this restricts the message to those not containing any variables.

If the Broadcast Agent decides to recall a message from the network and order that its broadcast cease, the linkage will ensure that all languages are recalled at the same time.

The system also provides for the specification of how long a single broadcast continues to be broadcast. For example, for many situations a 20 minute broadcast may be long enough, after which a new command to send the message again is be initiated. The PLBS system may provide for a default time to be set in the Broadcast Agent account. Additionally, in the advanced menu options, the Broadcast Agent may be enabled to set start and stop time.

In other cases, Carriers or their networks may require that the broadcast message have a start time and stop time specified to the cell. The message is held at the cell and transmitted only when the start time arises, then transmission will be at regular intervals until the stop time arises, unless a command is received by the cell to cease the message. As such, the PLBS includes a default start time that is set by the PLBS-SB to be NOW, and the stop time to be 20 minutes. In some situations, the Broadcast Agent may have authority to set up messages for delivery at a pre-determined time in advance, or to set the broadcast time for a longer or shorter time. For example, the Broadcast Agent may be planning a highway shutdown, and may pre-program the night's messages accordingly. This frees manpower at the busy command center at the very moment when attention may be needed on the radio and elsewhere.

In the advanced message window, a start and stop time box may appear which is set to the defaults. The Broadcast Agent has the option to change these, but as usual the administration system will check that the Broadcast Agent has authority to do so before proceeding with the message.

Channel codes define the type of message sent, which in turn defines the type of people being broadcasted to. The subscriber who owns the terminal has to switch on or off the channels at his discretion. The account will define which channel codes are defaults for this Broadcast Agent and which are allowed.

The Broadcast message is preceded by a channel code. Users may be given the option to select the type of messages they want to receive by going through a menu on their phone. Some mobile phones are sold with the default state set to disable the receipt of messages. However, to enable mass distribution of broadcast message, the channel numbers are defined for the various message types.

In any case, the Broadcast Agent may have another special need in mind other than to address the public for warnings. The Broadcast Agent may, for example, want to address only police officers or neighborhood watch volunteers in the area. In other instances, there may be automatic equipment in the area which needs to be commanded to perform in a certain way in some conditions and locations, for example, sirens to sound. If so, a different channel number is defined.

If the Broadcast Agent has the authority, the channel number may be changed. In the simple version, the default is the standard code for public safety messaging. In any case this code is checked against the Broadcast Agent profile by the Broadcast Agent Administrator before the message is sent to verify the authority of the Broadcast Agent.

In many areas, more than one official language is used. In such regions, people speaking one language, can be regularly crossing borders into countries which in themselves have multiple official languages, with primacy in different order. In other cases, such as the maritime service, information should be on the same code, regardless of which country the ship is in range of. Therefore, the system provides for the ability to transmit alert messages in all major official languages for a region. The system provides a mechanism to give the networks and governmental authorities flexibility in addressing this requirement.

Users may be required to turn one or more functions of their phone. The user may be motivated to do that if he knows that he will get messages in his language. If the user can speak more than one language, he can enable more than one code at his discretion. In addition, if the user is a tourist or traveling businessman, he will get messages in his own language if that host country transmits them as such. For example, at airports, authorities may decide to transmit in English as well as the official languages, so as to warn passengers regardless if they speak the local language or not. Popular holiday resorts are another example.

Furthermore there may be politically sensitive positions regarding which language is the first and which the second. In one embodiment, pre-assigning codes according the internationally recognized order specified in ISO 639 may be implemented. The use of 145 codes covers most languages (plus some spare for special cases). However, a network may use the unused codes for another purpose. In any case since there are 1,000 codes available, this loss is a low price to pay in return for a good solution.

There are some cases where internationally agreed codes are required. One case in point is that of the maritime service channel. Many small pleasure craft and small coastal fishing vessels are not fitted with marine radio equipment. However in many cases one of the occupants of the boat does have a mobile unit in their possession. Certainly most large ships do have a GSM installation. If so the coastal authorities may decide to relay maritime safety information over a CB maritime service channel. If so, we could expect coastal shipping to switch on this channel. In that case, the channel number should be the same for every port the ship may visit, requiring an internationally assigned channel. In another example, the United Nations (UN) has the responsibility to care for the security concerns of all international relief workers working for them and any Non Governmental Organizations (NGOs). If the UN security-coordinator (UNSECORD) had a standard channel, then this highly mobile but very vulnerable group would be reachable on a geographically specific basis, but without having to change the channel number on their phone each time they change border. These two examples, while extreme, show the benefits of the current system for supporting multi-border Broadcast Agents.

One embodiment of a coding scheme consistent with the PLBS is provided in Appendix 1.

All broadcast messages are logged by the PLBS-SB in the logfile and cannot be tampered with by the Broadcast Agent or Administrative Operator. In the case of any dispute over a message, the Broadcast Agent Administrator, the Administrative Operator, and/or a government authority may view the log to establish what has occurred.

This file may also be used for off line statistics and account administration. The reporting system may send a copy by e-mail to the Broadcast Agent and/or Broadcast Agent Administrators if required. In some cases billing can be derived from the message log and an off line billing gateway program which would use agreed information to derive billing.

The Broadcast Agent requires the permission of the local carrier to use their network for this purpose. The administration of individual accounts is provided to the Administrative Operator to define network guidelines for each Broadcast Agent Administrator. For each Broadcast Agent Administrator, the carriers who have agreed to carry his traffic are signaled individually. Broadcast Agent Administrator is provided with the ability to customize the interface between the various carriers to match the protocols or business requirements of the carriers.

The message is transmitted to the carrier for broadcast transmission over their network. In most cases, the message is transmitted by every known operator offering coverage of the area and may include mobile carriers, digital private radio systems operators, private radio system operators, internet providers, wireline telecommunication service providers, satellite service providers, CATV operators, etc.

The PLBS-SB sends a copy of the message and geographical information about the Broadcast Target Area/Footprint required to each operator's network center for further processing by the Carrier Broadcast Center (CBC) to determine which cells are involved, then send the signals to the correct switching center or Gateway platform. Some messages may be intended only for the private digital radio system used by the organization such as a police radio network. In other cases, sending a multimedia message such as a map or photo to a text-capable 2G network may not be applicable.

Carriers or telecommunications operators may decline to accept messages from a message source, or of a particular subject matter, context, or content. In each case, the networks which have been selected may be checked by an Administration Subsystem or Administrative Entity before the message is transmitted.

In some cases the sender may decide to recall the message before it has elapsed its time. In this case the Broadcast Agent will select the message from the message library and press the recall button. Administration sends the recall command to the concerned networks or carriers.

Emergency situations are very dynamic, and the situation may change shortly after sending the message and before the expiry of the message time. If so, the PLBS provides the Broadcast Agent with the ability to recall the message. The system also includes a recall button to recall the message as displayed in the window. Each message is given a daily number for fast recall purposes.

The User may wish to know that the broadcast has indeed been passed to the networks for broadcasting. This can be by an e-mail or a report box on the browser.

Since the actual broadcast is managed by the local carrier through his network of gateways and switches, PLBS-SB cannot have any further influence on the process after the handoff to the network has been done. Therefore any progress information we can pass back is only valid up to the moment of handoff.

The report system can send a pop up window back to the Broadcast Agent provided he has not logged off the server by then. This can show ticks indicating that the message was handed off to network. However it does not indicate that the message is actually being transmitted at this time.

Optionally the report system can send an e-mail to the Broadcast Agent Administrator to inform him that messages have been sent. Should any irregularities occur or other trigger events, such as the near exhaustion of agreed messages, then a report can be sent to the Broadcast Agent Administrators e-mail reporting this.

Reports may be automatically generated as plain text messages and sent to an electronic address or e-mail account defined by the Broadcast Agent Administrator and/or Administrative Operator.

The Web Portal, as hosted directly or indirectly by the PLBS Service Bureau communicates with a Web Browser at the Broadcast Agent's location, as discussed below. The objective of the Portal is the creation of a Broadcast Request, a file which holds the following information.
  a. Broadcast Target Area/Footprint
  b. Broadcast Message and related parameters
  c. Broadcast Agent User ID and Password.
  d. Status of the Broadcast Request, (times Proposed, Authenticated, Handed off) and status reports.

The Admission Control Subsystem ensures that the proposed Broadcast Request by the particular Broadcast Agent at this time is authentic before passing it to the networks.

For the Broadcast Agent and session, the Portal provides an environment for the Broadcast Agent consisting of the maps of his jurisdiction and the Broadcast Target Area/Footprint, message and broadcast libraries that apply. Portal gets this information from the Account data. When the Multi-Language feature is required, appropriate windows will be provided in the message window.

Broadcast Agent Web Portal creates a Broadcast Request record with the name of being the current system date and time from when the Create Message button was pressed.

When the Broadcast Agent presses the GO-button, the Admission system fetches the Broadcast Agent profile from the account database. It will now check all the parameters of the Broadcast Agent and message to see if the message will be admitted or declined.

When a message is declined, the Broadcast Record is marked as such by its status register and sent to reporting; a report is then generated and e-mailed as per the parameters in the account data. The broadcast record is then stored along with the reports in the broadcast log. The Broadcast Agent creates a new broadcast which has a new number.

The Broadcast Agent ID and password details are then checked against the profile to authenticate the Broadcast Agent. If not authentic then the message is declined. Admission will then check the Broadcast Target Area/Footprint against the profile, If not within the Jurisdiction, and then the message will be declined. Admission will then calculate the Pops figure for this message by multiplying the area derived from the Broadcast Target Area/Footprint, by the population density. Population density figure is fetched from Account data. The [total messages], [Pop density], and [total mess*pop] figure is then fetched from the account data, and the new figure is added in the broadcast record but not written into the account data. The total result is checked against the limits set in account data. If the limit is exceeded then the admission rules are checked to see if the broadcast may go ahead or not. If not then the message is declined. Alternatively a report may be generated according to the admission rules.

Multi language messaging checks may be performed to see if the Broadcast Agent has defined a message for each language as required by the government authorities. If not then the Broadcast may or may not be declined according to admission control rules.

The networks requested are checked against the Account Data. Portal may have defined networks that the account data has indicated, however in some cases some networks may accept some channels while others do not. If so, the broadcast may continue on the allowed networks and declined on others, or it may be declined altogether.

If Admission is satisfied that the Broadcast Request is valid, then it is sent to the distribution system.

The Admission control ensures that that any Broadcast Request meets with the approval based on preset guidelines. The parameters as to what is acceptable and what is not are set by the Administrative Operator in the Administration Data Base. Each registered Broadcast Agent, that is everyone who is allowed to create Broadcasts, has a separate Profile recorded in the Administration Database. Only the Administrative Operator has access to this file and can create, edit and delete Broadcast Agents. All Broadcast Agents belong to a Broadcast Agent Administrator, and may on no account have authority exceeding their Broadcast Agent Administrator.

The parameters used in the Administration Data Base are reviewed in the PLBS-SB System description document. There are other parameters about the User ID, the Broadcast Agent Administrator to whom the Broadcast Agent reports, and the current password and authentication key for each Broadcast Agent that may also be included.

The Administration subsystem is responsible for creating an object called the Broadcast Request. This file details everything known about each proposal. It also contains a check list of flags which are used by the system to track the progress of each Broadcast Request. A Broadcast Request is known by a unique ID consisting of the PLBS-SB which accepted the proposal, and the date time group identifying when it was accepted as a valid proposal.

When the Broadcast Agent presses the "propose" or "GO" button, Administration will check that the Broadcast Request has been created with enough required information, and is formatted correctly. When the Proposal is correctly formatted, it is recorded in the logfile data base, in an area where pending proposals are kept. The Administration system then orders the Admission control system to run.

Figure 3:
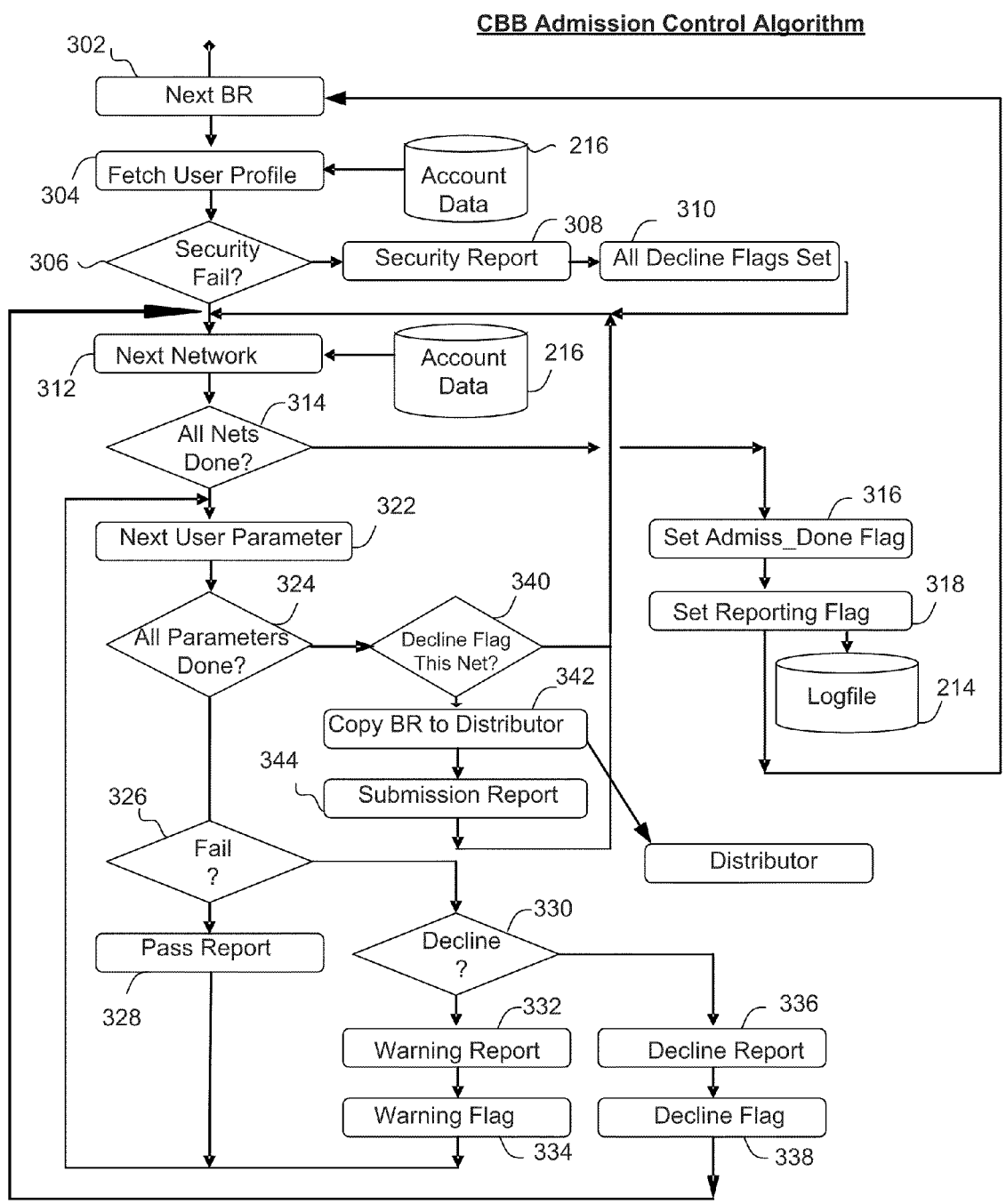
FIG. 3 is a flow chart for an admission control process within the public service message location broadcast system service bureau according to one embodiment.
Figure 4:
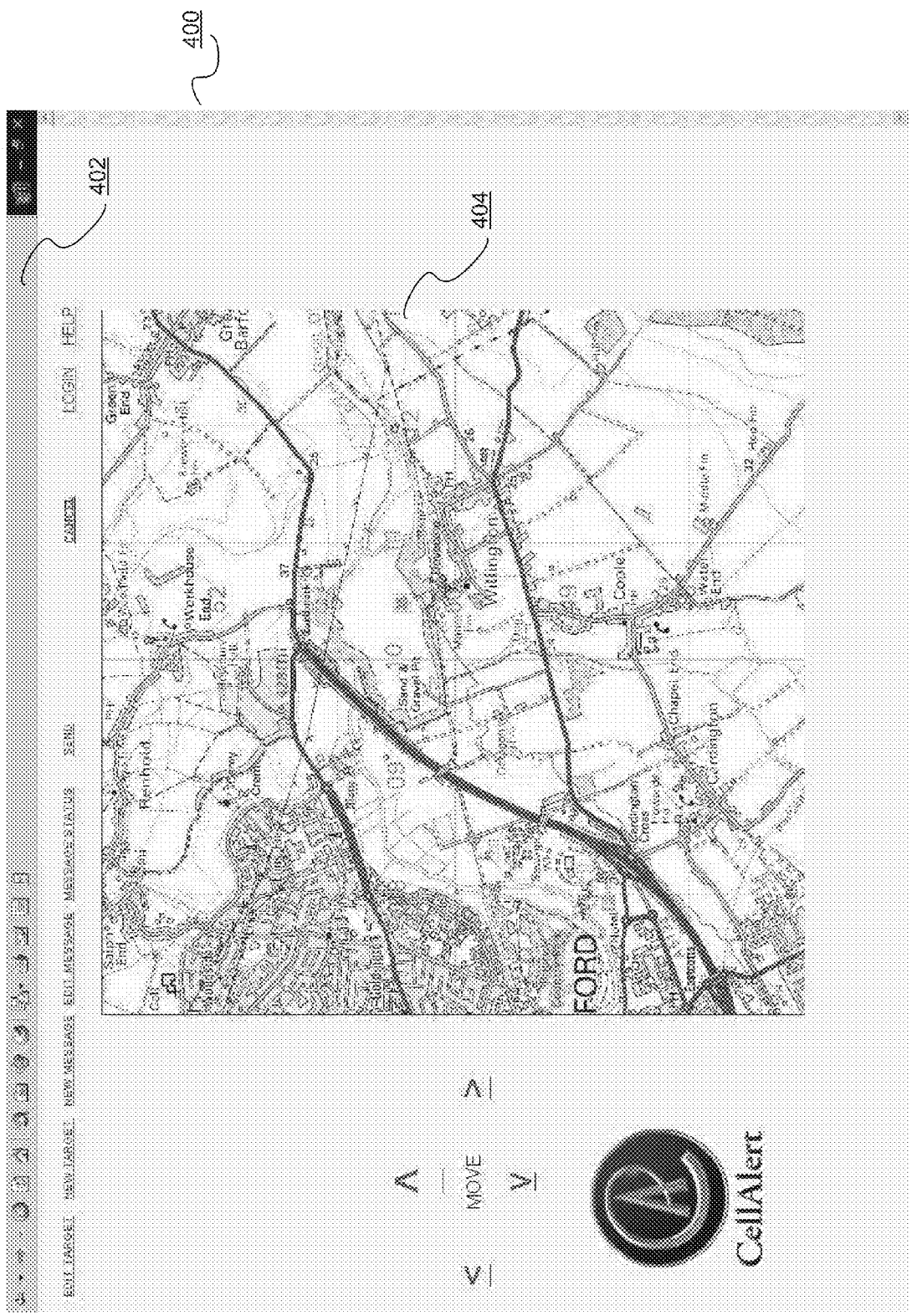
FIG. 4 is a screen shot of the Broadcast Agent Portal Webpage.
Figure 5:
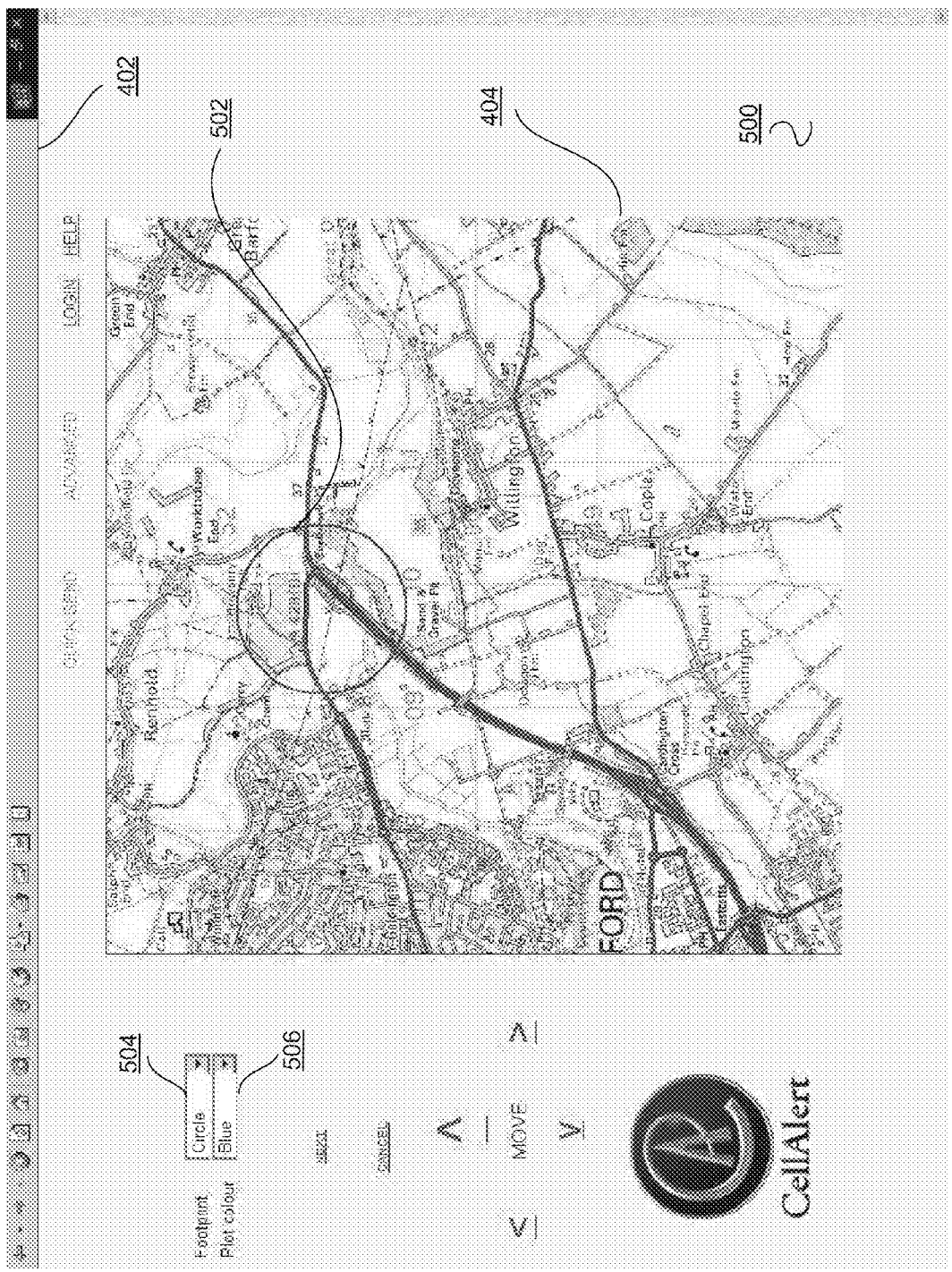
FIG. 5 is a screen shot of the Broadcast Agent Portal Webpage illustrating a Broadcast Agents initial designation of a target broadcast area.
Figure 6:
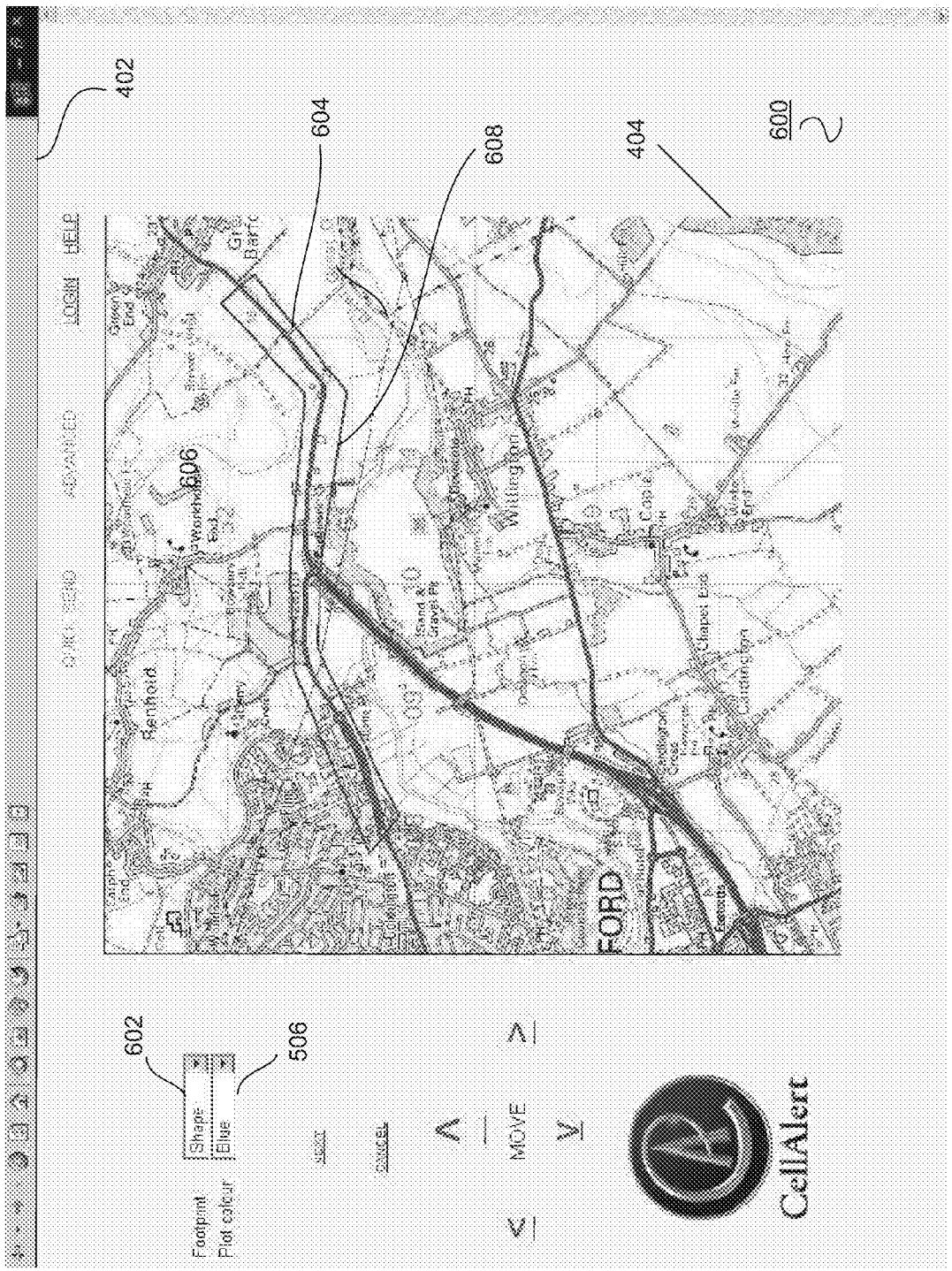
FIG. 6 is a screen shot of the Broadcast Agent Portal Webpage illustrating use of a shape tool to refine the designation of a target broadcast area.
Figure 7:
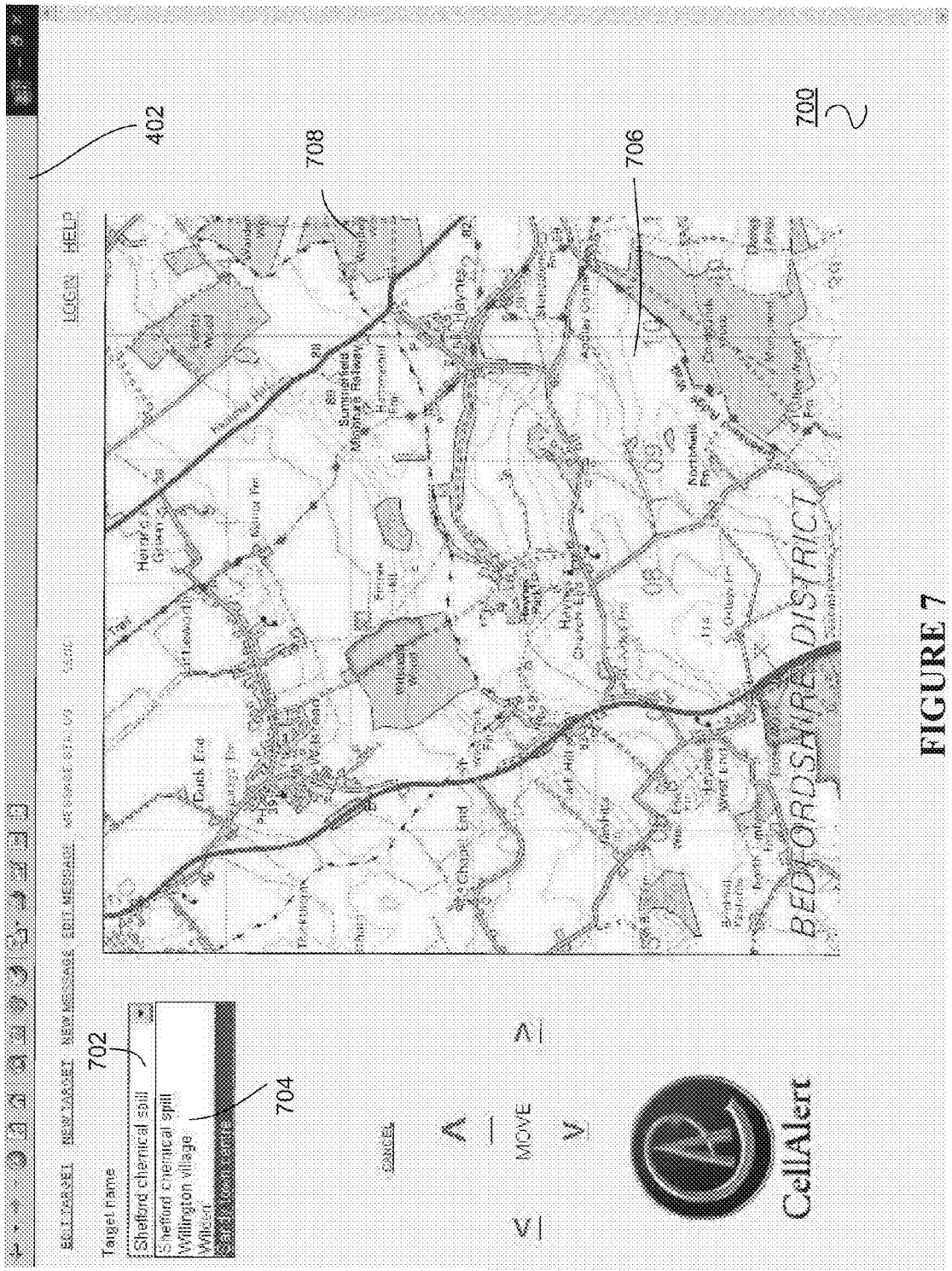
FIG. 7 is a screen shot of the Broadcast Agent Portal Webpage illustrating a library of foot print or predefined target broadcast areas.
Figure 8:
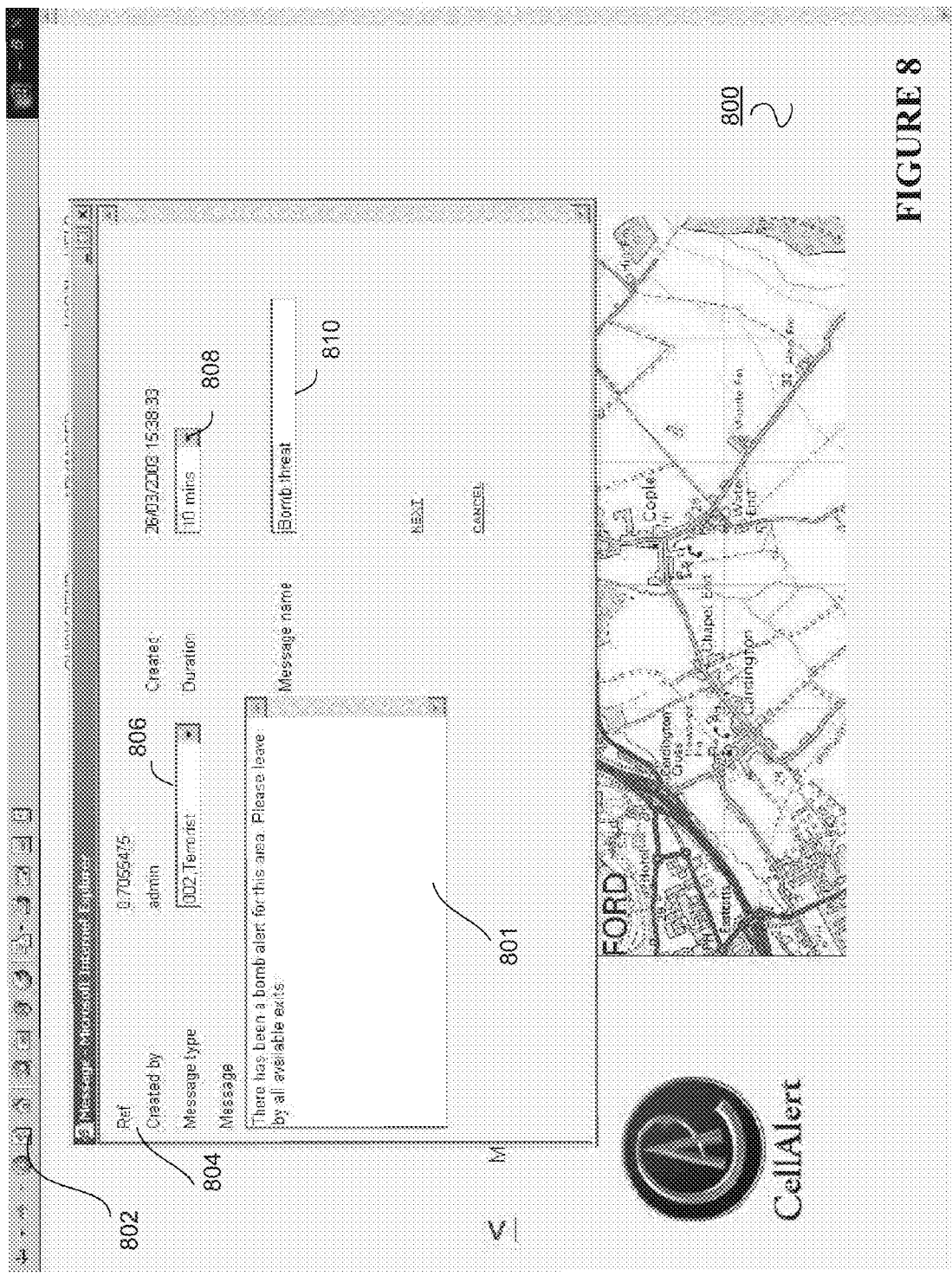
FIG. 8 is a screen shot of the Broadcast Agent Portal Webpage illustrating a dialogue box enabling the Broadcast Agent to create a message and parameters of the Broadcast Request.
Figure 9:
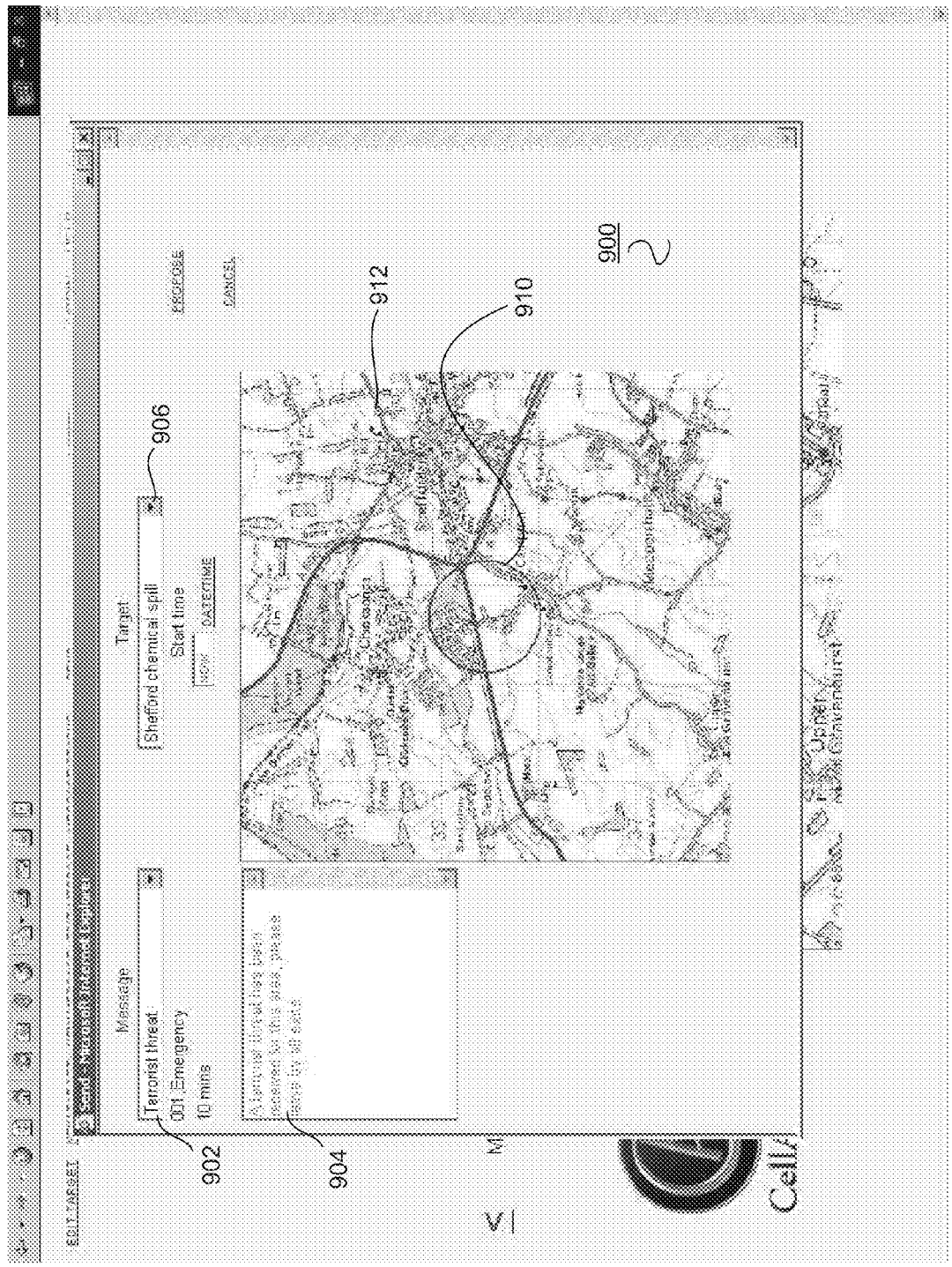
FIG. 9 a screen shot of the Broadcast Agent Portal Webpage illustrating a library of target broadcast areas and a library of messages.
Figure 10:
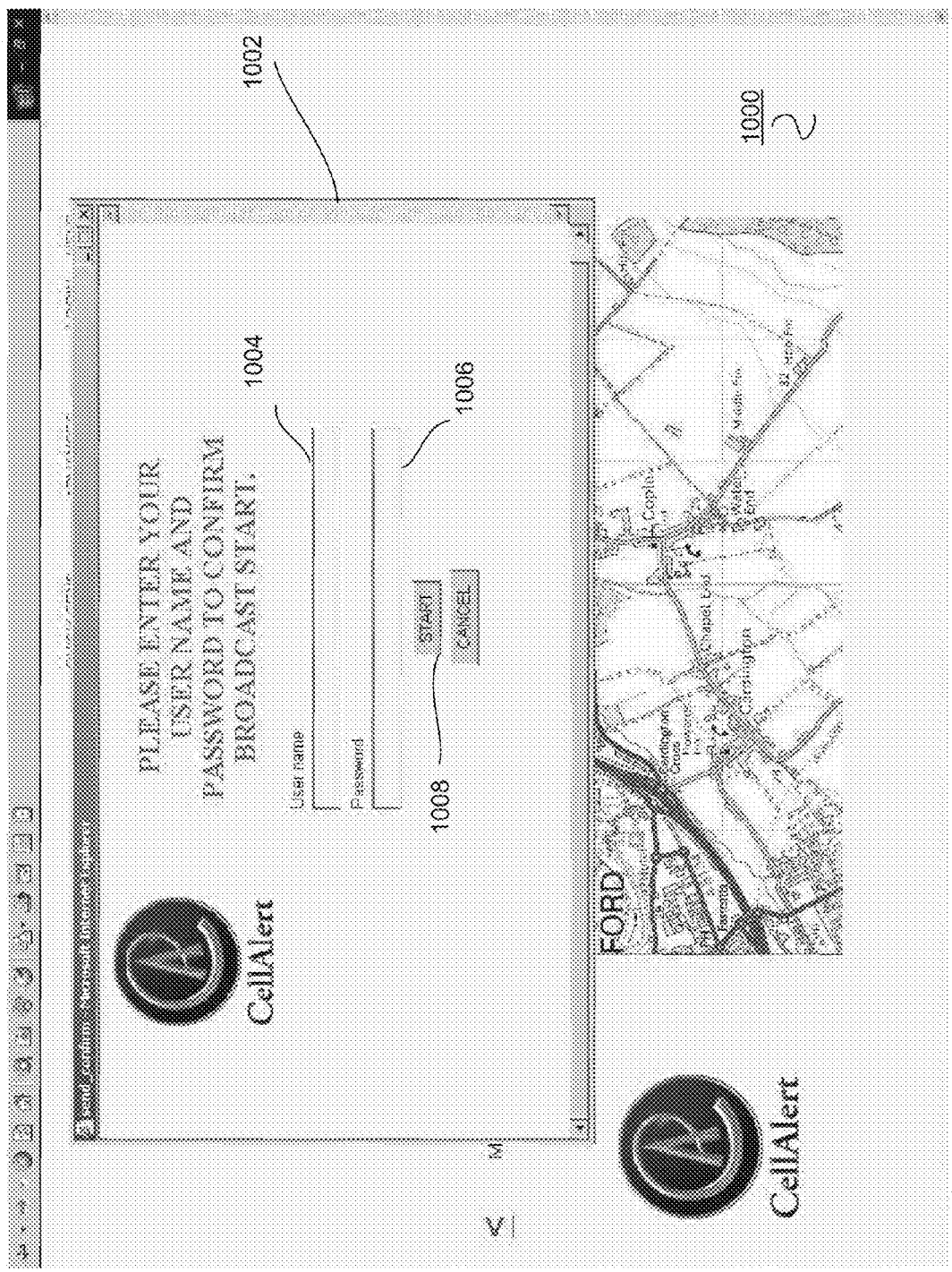
FIG. 10 is a screen shot of the Broadcast Agent Portal Webpage illustrating a Broadcast Agent Confirmation Entry prompt/window.
Figure 11:
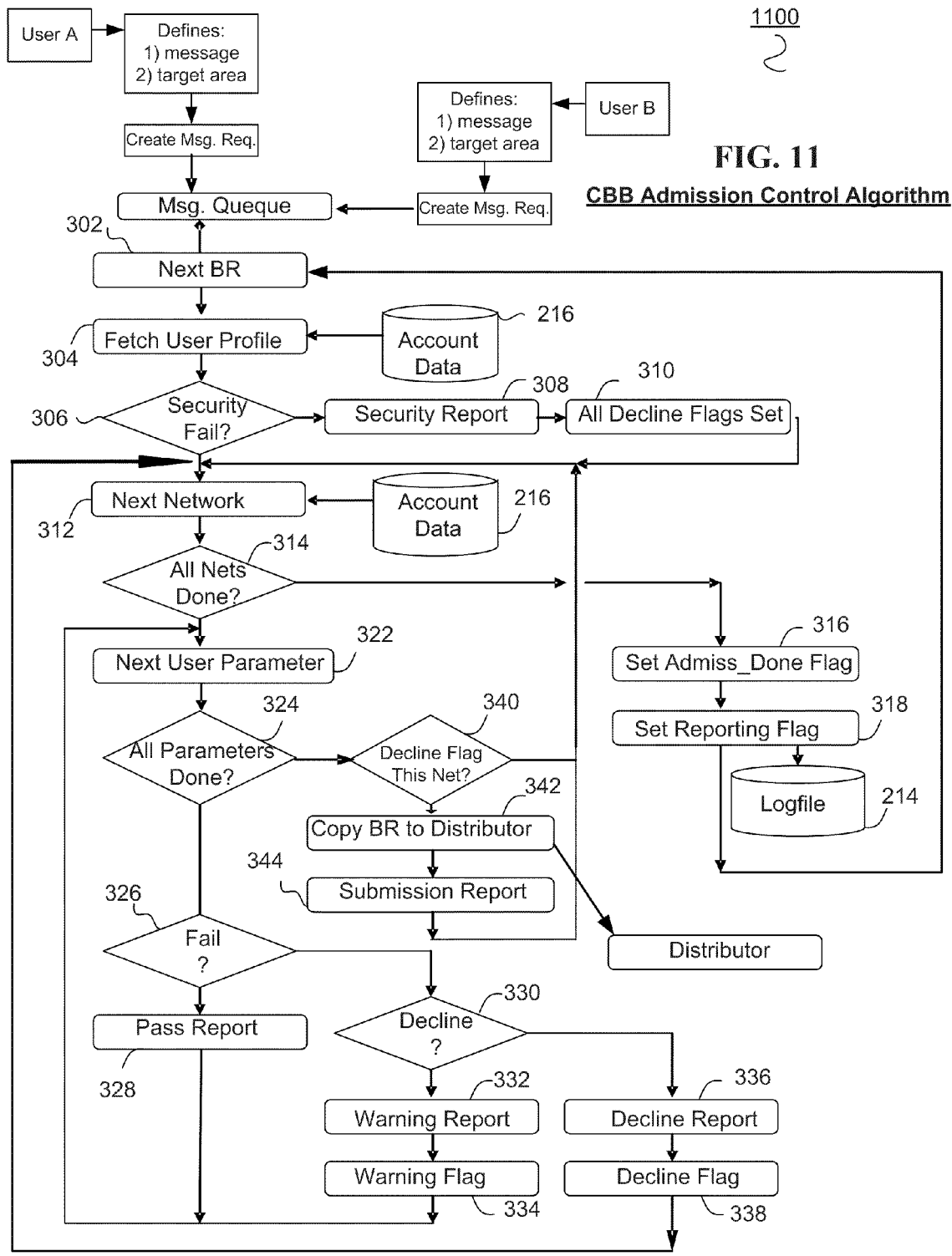
FIG. 11 is a second flow chart for an admission control process within the public service message location broadcast system service bureau as shown in FIG. 3 according to another embodiment.

Referring to FIGS. 3 and 11, the methods 300 and 1100 are admission control processes within the public service message location broadcast system service bureau and utilize the convention of having a yes answer coming out of the side, and a no answer from the bottom is applicable unless otherwise indicated.

Next Broadcast Agent—When activated, the Admission Control (admission) fetches the next Broadcast Agent from the logfile area where pending Broadcast Agents are waiting as shown in Process 302. The AC also copies all the parameters.

Fetch User Profile—The User ID is read and the Broadcast Agent profile is fetched from the Administration Data Base as shown in Process 304.

Security Fail—The User ID is checked against the password and authentication key entered in the database as shown in Process 306. (The Administration control system has validated the data link and network address of the originating terminal in the case of secure tunneling or Virtual Private Network or VPN access).

Security Report—If the security check fails, a short message explaining the reason for the failure is generated as shown in Process 308. The short message is appended to the report field for this Broadcast Request. In the case of a security offense or alert, additional data may be included such as details related to the attempted action.

All Decline Flags Set—To avoid a transmission of this Broadcast Agent, the Decline Flag is set for a Broadcast Request on all the network fields to restrict transmission as shown in Process 310.

Next Network—If there is no security problem, the Broadcast Request is examined to see which is the first network to be attempted. See Process 312. The Admission Parameters for this network will now be queried from the Administration Data Base and examined in Process 312. When this is performed for all networks, a copy of the Broadcast Request is sent to the distributor system which converts the Broadcast Request into a signal for sending to the Carrier Broadcast Center at the Network management center. A communication protocol is used which may be a standard protocol or an application specific protocol such as a Broadcast Message Submission Protocol (BMSP)).

All Nets Done—The end of file marker is checked and read to determine whether all required networks have been analyzed as shown in Process 314. When all networks will have been signaled, a copy is transmitted to the Broadcast Agent.

Copy To Reporting—A copy of all Broadcasts and Broadcast Requests are written to or stored to the Broadcast Request reporting field that is sent to the reporting subsystem for transmission to the Broadcast Agent Administrator and to the Carrier Broadcast Centers or their reporting subsystem.

Copy to Logfile—The Broadcast Request is stored in the Logfile and deleted from the pending area as shown in 214.

Admiss Done—An Admiss Done flag or notification is set on the Broadcast Request record along with a timestamp indicating completion of the administration process as shown in Process 316. Furthermore, as shown in Process 318, the reporting flag is set, and the method returns to Process 302 for processing of the next Broadcast Record.

Next Broadcast Agent Parameter—The Next Broadcast Agent parameter is retrieved from the Administration Data Base and compared to the requesting Broadcast Agent as shown in Process 322.

All Parameters Done—The All Parameters Done process ensures that all parameters have been evaluated and the file processing is near completion as shown in Process 324.

Fail?—The Fail process determines if a parameter in the Broadcast Request does not meet predefined criteria for a Broadcast Message as defined by the PLBS and/or of the Broadcast Agent Administrator as shown in Process 326.

Pass Report—If the parameter is within the predefined criteria, the reporting system appends to the Broadcast Request report a short message indicating which parameter has been passed as shown in Process 328. This provides for trouble shooting and resolving disputes. After Process 334, the method returns for processing of the next user parameter by Process 322.

Decline?—If the parameter under test does not fall within the predefined criteria, the parameter fails and special handling procedures are applied as shown in Process 330. Such procedures may enable a system override or an operator override such the Broadcast Request may continue even in light of the parameter within the predefined criteria. Such procedure may include checking the Decline parameter.

Warning Report—If the Decline Parameter is not met, a warning message is generated and appended to the Broadcast Request as shown in Process 332.

Warning Flag—A warning flag is set against the particular network as shown in Process 334. After Process 334, the method returns for processing of the next user parameter by Process 322.

Decline Report—If the Decline parameter indicates that the Broadcast Request is declined, a Decline Report is generated and appended to the Broadcast Request as shown in Process 336.

Decline Flag—A Decline Flag is set against that network upon indication of a Decline Parameter as shown in Process

338. A Decline Flag may apply to one or more networks as a function of the network facilities or arrangements. After setting this warning flag, the method returns for processing of the next network of Process 312.

Decline Flag set this Network—When all the parameters have been evaluated, the All Parameters Done message is returned. Prior to sending a Broadcast Request to a Broad Distributor for sending to the particular Carrier and Carrier's network or Carrier Broadcast Center (CBC), a determination of whether the Broadcast Request or message has been declined by the entity or system is determined. If the broadcast message has not been declined for the particular network, then the message is passed on as shown in Process 340.

Copy to Broadcast Request Distributor—A copy all or the relevant parts of the Broadcast Request is sent to the Broadcast Distributor or placed in a queue as shown in Process 342. The Broadcast Distributor may reformat the data according to one or more predefined parameters, formats or protocol associated with the transmission facility or link for communicating to the Carrier or the Carrier Broadcast Center (CBC).

Submission Report—A submission date and timestamp are appended to the report, and stored by the BLBS and/or Broadcast Agent Access Device as shown in Process 344. The process returns to the Next Network point so that the next network is evaluated since each network will have network specific criteria and parameters. After Process 344, the method returns for processing of the next network by Process 312.

As shown in FIG. 11 prior to Process 302, using the Broadcast Agent Access Device, a Broadcast Agent defines the target area by drawing shapes or indicating areas on a map to where the broadcast message should be sent. As the target area will likely be served by two or more carriers or telecommunications service providers, the PLBS determines which carriers serve all or a portion of the target area. The PLBS may perform this function by a Broadcast Distributor which may be an integral system or module or a separate standalone system or module. It may be implemented in hardware or software. The Broadcast Distributor routes the broadcast message to the Carrier Broadcast Center (CBC) of the carriers providing service to all or a part of the target area as defined in the Broadcast Request. This may be implemented in any possible arrangement including a table, chart, or map.

Operators may in turn have different models of Carrier Broadcast Center (CBC), for example, the GMG 1.5, CellTech, or the Logica 1100, so a different mode of signaling for each type may be provided. One known industry standard protocol is BMSP. Administration data includes routing or address information for the appropriate Carrier Broadcast Center (CBC) interface unit, so that the appropriate signaling protocol conversion occurs.

Signaling to the CBC may utilize an industry standard BMSP protocol that defines the area polygons in WGS84 co-ordinates, the message, and associated scheduling information. The CBC provides a check of the proposed broadcast message for validity and converts the polygons into a Cell Identification (CellID) list. In one embodiment, the CBC sends the CellID list to the broadcast switching centers (BSC) by standard communication protocol such as the GSM 03.49 protocol/list. Transmission between PLBS-SB and CBC may utilize commercially available systems and facilities that may include TCP/IP secure tunneling protocols, or X25 as demanded by the local carrier.

When a PLBS Location Selector is provided at the carriers or local carrier's location, the Broadcast Request file may be transmitted by FTP/TCP/IP to the Location Selector for local processing into a Cell ID list before sending to the CBC or the BSC.

The Administrative Operator utilizes the system to designate administrative and operating parameters and profiles, authorizations, and restrictions for each Broadcast Agent Administrator. These may be based on government regulations, negotiated agreements, standards or policies and practices. This may include establishing schedule of authorizations for various Broadcast Agent Administrators and/or Broadcast Agents.

The Administrative Operator also establishes within the system an Administration Database to set account parameters so that Broadcast Agent Administrators and their Broadcast Agents have defined authorization levels. The Administrative Operator also uses the system to establish and maintain an account for each Broadcast Agent and Broadcast Agent Administrator for billing and administration purposes.

The system is configured to enable the Administrative Operator to resolve review Logfiles and Broadcast Requests. The system enables the Administrative Operator to read the logfiles, and to read and write to the Administration Data Base. The Administrative Operator Management Subsystem is configured to provide the Administrative Operator with a web control panel or GUI environment in which to administer the User account data and system. Addition the system is configured to generate statistics for administration, management, reporting, and billing.

A Location Broadcast Reporter may be configured to store broadcast messaging data and to prepare and produce reports related to past, pending, and future broadcast messages in one or more areas. The Location Broadcast Report may be located at a disaster management office, a control room, or the PLBS-SB. Access to such reports and data is made available to authorized personnel of the PLBS operator or an administrative or government entity. Such reports may be made in real-time via a web-based interface such that immediate action may be taken or additional or related actions may be initiated.

When the Admission Control Subsystem does not accept the Proposed Broadcast Request for any reason, a status message may be sent to the Broadcast Agent Access Device and a Report Required flag may be set. In such as case, reporting obtains the profile from the account data to determine the appropriate procedure.

Additionally, a notice or dialogue box may be opened at the Broadcast Agent Access Device to report the situation to the Broadcast Agent. If the Broadcast Agent has logged off the Broadcast Agent Access Device, a notification such as an email report is sent to the Broadcast Agent Administrator and the Broadcast Agent according to predefined addresses and arrangements. A copy of the report is also appended to the Broadcast Request to provide a record of the action.

Reporting also provides for reporting of any activity on the account to the Administrative Operator and Broadcast Agent Administrator. This includes reporting of any warnings that the account may expire. Reporting also sends account information to the Broadcast Agent Administrator on a regular basis depending on parameters defined in the account data. Reports are stored in the logfile which may be accessed by the Broadcast Administrative Operator.

A Broadcast Agent Terminal accessing the Broadcast Agent Portal or Webpage may be located at a Disaster Management Office such as a police control room. The authorized Broadcast Agent creates and proposes the message using a web or internet browser, with web access, public service message location broadcasting system Direct, or the Public Service Location Broadcast Controller (PLBC).

The Broadcast Agent interacts with the PLBS-SB over a web page, (via a Web Portal); loading of special client software is an unnecessary. Almost any computer can use PLBS-SB without any modification at all.

The Broadcast Agent accesses the Public Service Location Broadcast System (PLBS) via a communication network including the Internet and/or the World Wide Web. The Broadcast Agent device may be any communication device and is preferably one that is configured to access the Internet and/or to host a webpage. This includes a personal computer, laptop computer, mobile phone, and personal administrative device and variations thereof.

The Broadcast Agent device access a webpage or portal hosted directly or indirectly by the public service message location broadcasting system. Any current or future web, internet, or similar and future services browser or access method may be used by the Broadcast Agent. A standard language such as in one embodiment a Hyper Text Mark-up Language, HTML, may be utilized using any existing or future hardware and/or software platform. Standard, proprietary, and/or commercially available communications systems and protocols may be utilized to provide the various communications facilities and interconnections.

When added security is desired, commercially available or proprietary effective security protocols and measures such as SSL with public key encryption may be employed along with private networking facilities, Virtual Private Network (VPN) facilities, and/or secure tunneling features.

A Broadcast Agent Web Portal is made available throughout a LAN or an Internet to provide each and every Broadcast Agent with the flexibility of accessing the Public Service Message Location Broadcast System (PLBS) via any workstation wherever it may be located, including ones located at a home, remote office, or a portable computing computer, device or platform. The system may utilize wireless LANs such as the 802.11 technology and mobile Internet systems and networks.

The Broadcast Agent Web Portal is presented as a web page. The Broadcast Agent Webpage may be designed in a design configuration or pattern with an appearance of a control room or panel. Additionally, Broadcast Agent Webpage may be consistent a Geographical Information System (GIS) service portal or webpage.

The Broadcast Agent Web Portal or Webpage may include or be composed of one or more maps with scroll bars and zoom options for easy and quick map viewing. One or more tool bars provide for Broadcast Agent with the ability to select and define a broadcast target area in a map format. While currently web browsers do not process Geographical Information System (GIS) data, the map may be a jpeg format image or file with conversions for position being performed by the PLBS-SB to aid the browser. However, it is expected that in the future the Broadcast Agent Web Portal or Webpage will directly support GIS map data, displaying, and definitional inputs.

The Homepage of the Broadcast Agent Webpage may present a map of the demonstration zone and a city or location name associated with the particular geographic area and/or the particular Broad Agent. In an alternative embodiment, the Homepage may display general data available to all users.

When a Broadcast Agent logs in, a map of the jurisdiction of that Broadcast Agent is displayed. The map is established by the Administrative Operator and/or the Broad Agent Administrator to prevent accidentally sending messages to an unrelated or unauthorized area.

The Broadcast Agent Web Portal or Webpage are designed to enable the sending or requesting of a Broadcast Request or message within six enters or "clicks" from the Broadcast Agent accessing the Web Portal. Similarly, the system is designed so that such actions are in a timely manner and may be accomplished in 15 seconds.

The Broadcast Agent utilizing the Broadcast Agent Webpage uses a pointing device such as a mouse or touchpad to define an area for which the message will be broadcast, e.g., the broadcast target area or Broadcast Target Area/Footprint. Preferably, the broadcast target area is defined by the Broadcast Agent through a graphical selection means such as clicking a mouse on the displayed map.

After the Broadcast Agent defines the broadcast target area, the Broadcast Agent initiates a message menu button on the menu bar and enters a message such as by typing a text message into a keyboard.

After this is complete, the Broadcast Agent authenticates the Broadcast Request through one or more authentication procedures. These may include entering a User ID and Password, speaking a voice authentication message, or otherwise. After the Broadcast Request has been authenticated, the Broadcast Request is forwarded to the Public Service Location Broadcast System (PLBS) Service Bureau.

Optional system features may also be made available to the Broadcast Agent via the Broadcast Agent Web Portal or Webpage. These may be implemented as additional options on an Advanced button or the toolbar. These optional features may include:

Broadcast Target Area/Footprint library
Message library
Multiple language messages
Long messages
Start time, Stop time
Channel codes
Recall messages
Select networks
Progress windows The Broadcast Agent Web Portal and Webpage may provide one or more progress windows.

Once the Broadcast Agent has pressed the GO-button, and accepted liability for the message by typing his User ID and password, the message is not transmitted directly. Instead it is sent to the PLBS-SB's administrations subsystem where the Broadcast Agent is checked out for authority for this message. For example, the message has been defined for transmission within his jurisdiction. There may be restrictions on how many messages one individual or center may send in a period. This may be defined by the local carriers, government entities, or by the PLBS-SB operator.

Billing for the service may be done on the basis of the area that was defined for the message, or the population density assumed for the message. In each case the Broadcast Agent may want to know what the message is costing before deciding to proceed.

The Broadcast Agents request and message are checked over thoroughly by the administration subsystem to make sure of compliance to all agreements, with the Broadcast Agent, the government authorities and the local carriers. Only in the case of full compliance does the message proceed. If so, a dialogue box confirms when each local carrier has accepted the message.

If not, then the Broadcast Agent will get a dialogue box explaining why the message was declines and a suggestion as to what to do next to get the message sent off quickly. For example, a smaller less ambitious Broadcast Target Area/Footprint may be tried, or perhaps authorization from a higher ranking Broadcast Agent.

Alternatively, when a web-based interface cannot handle a particular application or situation, the Advanced Broadcast Controller (PLBC) may provide this functionality. This third party application, can call on more, perhaps confidential information to define the broadcast area. In this way the confidential information never leaves the building.

At the local carrier's office, there is a Carrier Broadcast Center (CBC) server collates the cell Latitude and Longitude data received from the PLBS-SB with the locally provided Cell ID data for that carrier's network. A cell serving area map or table is derived from local carrier planning tool, systems, and data. Typically a carrier's engineering group prepares similar information for planning, maintenance and administration purposes.

Location broadcast messages are broadcast by the Cellular Network Operators on a per-cell basis over a location broadcast channel. In order to send a location broadcast message, a signal is sent to the Carrier Broadcast Center. From here, to the Base Station Controllers (BSC), containing the message to be transmitted, and crucially, the Global Cell IDs of the cells in which the broadcast is to be made, along with some other data such as how often and when the message is to be broadcast.

Cellular operators guard the information about their cells (the cell data) with great care, as the information can be useful to a competitor. They may find the prospect of having this information on multiple unsecured servers to be unacceptable.

According to one embodiment of the PLBS, each carrier maintains and controls access to their own proprietary network data including cell locations and cell serving areas. Each carrier receives geographic data defining the target area for the public service broadcast and determines which transmissions and transmitting locations relate to the target area. Once established, each carrier initiates message broadcasting to only those locations or areas which relate in whole or in part to the target area. As such, competing carriers do not have access to other carrier's networks or proprietary network or customer data.

Transmission between PLBS-SB and CBC is achieved with available telecommunication facilities and protocols which may include TCP/IP secure tunneling protocols, security, and authentication. Transmission may be by wireline, wireless, including satellite facilities.

In one embodiment, the BLBS system ensures that the Carrier's cell data is retained by the Carrier in a look up table in the Carrier Broadcast Center at the Local carrier's office. This includes the Cell Identification Codes of the cells, the Latitude and Longitude positions of their respective Radio Base Station sites and azimuth data for their sectors. This leads to per-cell resolution, but for the first application this may be good enough considering the small size of modern cells, which are typically 1-3 Km across (about 2 miles). The cell data never leaves the Network's office. The local carrier such as a mobile service provider provides the hosting of the cell-broadcast messaging technology, access to the local cell network, and transmission of the cell-broadcast messages to its subscribers. Additionally, the carriers or mobile unit service providers may provide cell-site geographic coverage data either internally or to the PLBS operator to enable the operator GUI interface.

Location broadcast messages may be employed in several ways when numerous operators or carriers in a particular geographical area require the same information in a timely manner. Such information may include text messages relating to emergency situations, and, for 3G cells and phones, pictures of wanted or missing persons, graphical data, maps of problem areas including areas to avoid and escape routes.

Location broadcasting is a function of cellular networks and is defined by the official standardization bodies, such as GSM MoU, (GSM 03.41) UMTS, 3GPP/3GPP2 and IS95 CDMA. Many networks have location broadcast channels defined for their networks which are unused at present for lack of a suitable application.

There is typically more than one carrier or operator providing service in the same area. There is no co-ordination of cell planning between competing operators, and as such, the Cell layouts and Cell IDs of each are different. In addition, due to constant improvements in telecommunication and cell coverage and capacity, the network design, and size and layout of geographic network systems and cells covering a particular area can be dynamic, e.g., network reconfigurations, cell splits and switch cutovers.

Also, many networks have a hierarchical network or cell structure system, with overlapping patterns of networks or cells of different sizes, such as Umbrella Cells, Macro Cells, Overlaid cells, Micro Cells and Pico cells. They may also have multiple layers of sub-band structure in different frequency bands such as (850-1900 or 900-1800-2 Ghz, with each having different Cell IDs and different base station spacing.

Multi-network configurations will continue to increase in complexity with the introduction of 3G General Packet Radio Service (GPRS), EDGE, CDMA2000, and UMTS. 3G location broadcast messages will be much more capable, so different Cell ID tables are entered for a plain text version of the broadcast than for a multi-media version.

A single signal of about 1 KB may be used by the Carrier for each transmission area or cell. The transceiver then carries out the repetition of the message for the time required.

User receiving devices may include mobile or cellular phones, PDA's, PC's, etc. Receiving devices may provide a distinct alert ring-tone that continues until the message is acknowledged by a local user. Such features and functions are dependent on the features and functionality of the various receiving devices. Some receiving devices may be configured to receive text messages, graphical data, images, and maps or may be capable of connecting to a designated website that provides additional information.

With one or more embodiments of the current system, special handsets or mobile unit units are not required. Global System for Mobile Communication (GSM) handsets may display a public service message location broadcasting system message as provided by a supporting GSM mobile service provider. Additionally, 3rd Generation mobile unit services providers and mobile unit or cellular devices will display location broadcast messages consistent with the public service message location broadcasting system.

A public service message location broadcasting service may also display a public service message location broadcasting system provider insignia or service mark.

Because public service message location broadcasting system is independent of the mobile unit service providers voice and SMS channels, cell-broadcasting will continue to operate during emergencies that result in high calling volume thereby enabling local authorities with a viable communications link for emergency instructions despite interruptions in voice and SMS service.

In operation, the public service message location broadcasting system may be provided, in one embodiment, by a method described herein. In the event of a need for a public service message broadcast, an authorized Broadcast Agent enters a password to access the public service message location broadcasting system via a Broadcast Agent System accessing a Broadcast Agent Web Portal from an Internet-attached device. The screen recognizes the Broadcast Agent and displays a map or illustration of his jurisdiction.

The Broadcast Agent defines or selects the target area which may be the entire authorized Broadcast Jurisdiction or may be a portion thereof. The Broadcast Agent constructs a text message indicating the nature of he emergency and/or required action. The Broadcast Agent specifies the length of time the message is to be broadcast and/or received by the receiving devices in the target area. The Broadcast Agent utilizing the Broadcast Agent System confirms and sends the data to the public service message location broadcasting system server.

The public service message location broadcasting system's Broadcast Data Management (BDM) server reformats the data and forwards it to the Carrier Broadcast Center for each of the telecommunication carriers providing service within the target area.

The Carriers Broadcast Center (CBC) selects one or more sub-networks and/or cell-sectors (such as transmission towers) that serve all or a portion of the target area so that the entire target area is covered by a broadcast. The CBC broadcast the message to all receiving devices within its serving area. The CBC broadcast transmission process is repeated for the duration of the alert to accommodate additional devices entering, becoming available, or being activated/powering-on within the target area. Receiving devices located within the broadcast sub-networks or cells receive the public service broadcast message, and may provide an alert and display of the message.

In practice, operation of one or more embodiments may be described by the following example.

It is late at night and a river level is rising to dangerous levels. The local police want to warn the population at risk, the people who live in the area likely to flood. However since it is night time, they are not watching their televisions or listening to the radio. The senior police officer, or disaster manager, in the position of a Broadcast Agent accesses the public service message location broadcasting system web site that is located at a central site. The officer selects a map of the area that is in danger. The officer defines or selects a geographic broadcast target area to be notified of the danger. The officer enters a message indicating the nature of the danger and suggested actions such as FLOOD WARNING in your area. The officer initiates the broadcast messaging by following a security procedure and presses a Go-button.

The PLBS-SB receives the messages, performs a check on the validity of the officer as a Broadcast Agent that is proposing the message for the particular notification or broadcast target area. Once validated, the PLBS-SB sends messages to each of the telecommunication service providers or carrier having networks, coverage, or receiving units within the defined coverage area.

Each local telecommunication service provider receives the message and broadcast target area definitions from the broadcast system and initiates transmission of the broadcast message to the particular transmission networks serving the defined notification area. The local network of the telecommunication service provider broadcasts the message to every active compatible receiving unit active within the defined notification area. Each receiving unit receives the broadcast message and displays the message and may provide a common or unique alerting signal.

When introducing aspects of the disclosure or embodiments thereof, the articles "a", "an", "the", and "said" are intended to mean that there are one or more of the elements. The terms "comprising", "including", and "having" are intended to be inclusive and mean that there may be additional elements other than the listed elements.

In view of the above, it will be seen that several aspects of the disclosure are achieved and other advantageous results attained. As various changes could be made in the above exemplary constructions and methods without departing from the scope of the disclosure, it is intended that all matter contained in the above description or shown in the accompanying drawings shall be interpreted as illustrative and not in a limiting sense.

It is further to be understood that the steps described herein are not to be construed as necessarily requiring their performance in the particular order discussed or illustrated. It is also to be understood that additional or alternative steps may be employed.

APPENDIX 1

| | Code channel assignments |
|---|---|
| 500 | common training, exercise and test channel. |
| 501-650 | Languages listed in order according to ISO 639. |
| 501 | aa Afar |
| 502 | ab Abkhazian |
| 503 | af Afrikaans |
| 504 | am Amharic |
| 505 | ar Arabic |
| 506 | as Assamese |
| 507 | ay Aymara |
| 508 | az Azerbaijani |
| 509 | ba Bashkir |
| 510 | be Byelorussian |
| 511 | bg Bulgarian |
| 512 | bh Bihari |
| 513 | bi Bislama |
| 514 | bn Bengali, Bangla |
| 515 | bo Tibetan |
| 516 | br Breton |
| 517 | ca Catalan |
| 518 | co Corsican |
| 519 | cs Czech |
| 520 | cy Welsh |
| 521 | da Danish |
| 522 | de German |
| 523 | dz Bhutani |
| 524 | el Greek |
| 525 | en English |
| 526 | eo Esperanto |
| 527 | es Spanish |
| 528 | et Estonian |
| 529 | eu Basque |
| 530 | fa Persian |
| 531 | fi Finnish |
| 532 | fj Fiji |
| 533 | fo Faeroese |
| 534 | fr French |
| 535 | fy Frisian |
| 536 | ga Irish |
| 537 | gd Scots Gaelic |
| 538 | gl Galician |
| 539 | gn Guarani |
| 540 | gu Gujarati |
| 541 | ha Hausa |
| 542 | hi Hindi |
| 543 | hr Croatian |
| 544 | hu Hungarian |
| 555 | hy Armenian |
| 556 | ia Interlingua |
| 557 | ie Interlingue |
| 558 | ik Inupiak |
| 559 | in Indonesian |
| 560 | is Icelandic |
| 561 | it Italian |
| 562 | iw Hebrew |
| 563 | ja Japanese |
| 564 | ji Yiddish |
| 565 | jw Javanese |

APPENDIX 1-continued

| Code channel assignments | | |
|---|---|---|
| 566 | ka | Georgian |
| 567 | kk | Kazakh |
| 568 | kl | Greenlandic |
| 569 | km | Cambodian |
| 570 | kn | Kannada |
| 571 | ko | Korean |
| 572 | ks | Kashmiri |
| 573 | ku | Kurdish |
| 574 | ky | Kirghiz |
| 575 | la | Latin |
| 576 | ln | Lingala |
| 577 | lo | Laothian |
| 578 | lt | Lithuanian |
| 579 | lv | Latvian, Lettish |
| 580 | mg | Malagasy |
| 581 | mi | Maori |
| 582 | mk | Macedonian |
| 583 | ml | Malayalam |
| 584 | mn | Mongolian |
| 585 | mo | Moldavian |
| 586 | mr | Marathi |
| 587 | ms | Malay |
| 588 | mt | Maltese |
| 589 | my | Burmese |
| 590 | na | Nauru |
| 591 | ne | Nepali |
| 592 | nl | Dutch |
| 593 | no | Norwegian |
| 594 | oc | Occitan |
| 595 | om | (Afan) Oromo |
| 596 | or | Oriya |
| 597 | pa | Punjabi |
| 598 | pl | Polish |
| 599 | ps | Pashto, Pushto |
| 600 | pt | Portuguese |
| 601 | qu | Quechua |
| 602 | rm | Rhaeto-Romance |
| 603 | rn | Kirundi |
| 604 | ro | Romanian |
| 605 | ru | Russian |
| 606 | rw | Kinyarwanda |
| 607 | sa | Sanskrit |
| 608 | sd | Sindhi |
| 609 | sg | Sangro |
| 610 | sh | Serbo-Croatian |
| 611 | si | Singhalese |
| 612 | sk | Slovak |
| 613 | sl | Slovenian |
| 614 | sm | Samoan |
| 615 | sn | Shona |
| 616 | so | Somali |
| 617 | sq | Albanian |
| 618 | sr | Serbian |
| 619 | ss | Siswati |
| 620 | st | Sesotho |
| 621 | su | Sundanese |
| 622 | sv | Swedish |
| 623 | sw | Swahili |
| 624 | ta | Tamil |
| 625 | te | Tegulu |
| 626 | tg | Tajik |
| 627 | th | Thai |
| 628 | ti | Tigrinya |
| 629 | tk | Turkmen |
| 630 | tl | Tagalog |
| 631 | tn | Setswana |
| 632 | to | Tonga |
| 633 | tr | Turkish |
| 634 | ts | Tsonga |
| 635 | tt | Tatar |
| 636 | tw | Twi |
| 637 | uk | Ukrainian |
| 638 | ur | Urdu |
| 639 | uz | Uzbek |
| 640 | vi | Vietnamese |
| 641 | vo | Volapuk |
| 642 | wo | Wolof |
| 643 | xh | Xhosa |

APPENDIX 1-continued

| Code channel assignments | |
|---|---|
| 644 | yo Yoruba |
| 645 | zh Chinese |
| 646 | zu Zulu |
| 646-669 | locally specified purpose or language. |
| 670-699 | International alert channels. |
| 671 | Maritime service channel. |
| 672 | Aeronautical service channels. |
| 673 | Amateur service channels. |
| 674 | Scientific services. |
| 690-699 | UN and International Organisations. E.G. |
| 690 | UNSECORD (UN Security Co-Ordinator.) |
| 691 | UNICEF (Child security) |
| 692 | WFP |
| 693 | WHO |
| 694 | UNHCR |
| 695 | OCHA |
| 696 | Red Cross/Crescent Movement. |

Other channels at the discretion of the networks, and in conjunction with the governmental authorities and other interested parties.

What is claimed is:

1. A message alert broadcast broker system for providing a broadcast message to a plurality of user devices located within a geographically defined broadcast target area, the system comprising:
a broadcast service bureau communicatively coupled for receiving from one of a plurality of coupled broadcast agent access systems providing a broadcast request from an originating broadcast agent associated one broadcast agent access system, the broadcast request including a broadcast agent identification, the geographically defined broadcast target area, a broadcast message, and a broadcast channel code, the broadcast service bureau configured for verifying the broadcast request as a function of the broadcast agent identification including an authority of the originating broadcast agent to send the broadcast message to the broadcast target area using the broadcast channel code,
the broadcast service bureau processing the verified broadcast request for transmission to one or more mobile telephone networks providing service to at least a portion of the broadcast target area of the broadcast request.

2. The system of claim 1, further comprising a carrier broadcast center coupled to the broadcast service bureau configured for receiving the broadcast request, identifying the one or more mobile telephone networks providing service to at least a portion of the broadcast target area, converting the broadcast target area to network addresses of network transmission devices serving the broadcast target area including determining particular network transmission devices serving at least a portion of the broadcast target area, and identifying the network addresses for each determined particular network transmission device and transmitting the broadcast message and broadcast channel code to the network addresses of the particular network transmission devices for transmission by the particular network transmission devices to user receiving devices over a broadcast channel associated with the broadcast channel code.

3. The system of claim 2 wherein the network transmission devices serving the broadcast target area and the particular network transmission devices are wireless cellular network transmitters, each of the wireless cellular network transmitters having a cell id network address, wherein the identified network addresses are cell id network addresses.

4. The system of claim 3 wherein the carrier broadcast center transmits the broadcast request to the particular network transmission devices using the cell id network addresses following the conversion of the broadcast target area into the network addresses.

5. The system of claim 2, wherein the broadcast service bureau verifies an authority of the broadcast agent to transmit the broadcast message to the broadcast target area as a function of a broadcast message jurisdiction stored in the broadcast service bureau for the originating broadcast agent, the verifying ensuring that the broadcast message jurisdiction of the originating broadcast agent includes the broadcast target area, said broadcast service bureau configured for transmitting the broadcast message and the broadcast target area to the carrier broadcast center responsive to a positive verification.

6. The system of claim 1, further comprising a reporter module for reporting the broadcast message and the broadcast target area.

7. The system of claim 1 wherein the broadcast service bureau further includes a distributor receiving the broadcast message and broadcast target area and maps the broadcast target area to determine which one or more of the mobile telephone networks from among a plurality of mobile telephone networks provide broadcast distribution systems serving the broadcast target area, and wherein the distributor identifies the one or more mobile telephone networks for the broadcast target area and determines whether each of the identified mobile telephone networks has a mobile telephone network dedicated carrier broadcast center.

8. The system of claim 7 wherein the broadcast service bureau determines that multiple mobile telephone networks provide service to at least a portion of the broadcast target area, the broadcast service bureau transmits the verified broadcast request to each of the determined multiple mobile telephone networks.

9. The system of claim 1 wherein the broadcast request includes one or more broadcast channel codes, and wherein at least one of the channel codes identifies a language of the broadcast message.

10. A public service message broadcast service bureau system providing a broadcast message to a network transmission device serving a broadcast target area, the system comprising:
    a webpage server having a webpage configured for receiving broadcast agent input from a particular broadcast agent including a broadcast request having a geographically defined broadcast target area defined as a subset of a broadcast transmission serving area, the broadcast message, and one of more broadcast channel codes; and
    a computer hosting the webpage server over a first communication interface, said computer receiving the broadcast agent input, verifying an authority of the particular broadcast agent to transmit the broadcast message to the broadcast target area and transmitting over a second communication interface the broadcast request to one or more carrier broadcast centers serving one or more local broadcast transmission systems, the one or more carrier broadcast centers receiving the broadcast request, converting the broadcast target area to network addresses of network transmission devices serving the broadcast target area including determining only particular network transmission devices serving at least a portion of the broadcast target area, and identifying the network addresses for each particular network transmission device and transmitting the broadcast message to the network addresses of the particular network transmission devices for transmission by the particular network transmission devices over broadcast channels associated the one or more broadcast channel codes in the broadcast request.

11. The system of claim 10 wherein the computer verifies the authority as a function of the one or more broadcast channel codes of the broadcast request.

12. The system of claim 10 wherein the computer verifies the authority of the particular broadcast agent as a function of a broadcast message jurisdiction of the particular broadcast agent including the defined broadcast target area, said system configured for transmitting the broadcast message to a local broadcast system being responsive to the authority verification.

13. The system of claim 10 wherein the computer further includes a distributor receiving the broadcast request and maps the broadcast target area to determine which one or more broadcast distribution networks from among a plurality of broadcast distribution networks provide broadcast distribution systems serving the broadcast target area, and wherein the distributor identifies the broadcast distribution networks for the broadcast target area and determines whether the determined one of more broadcast distribution networks has a mobile telephone network dedicated carrier broadcast center.

14. The system of claim 10 wherein the computer maps the broadcast target area into network addresses and transmits the broadcast message using the mapped network addresses for direct network addressing of the broadcast message to remote selectors for distribution of the broadcast message within the one or more local broadcast transmission systems that serve the broadcast target area.

15. A method of public service broadcast messaging to a broadcast target area, the method comprising:
    hosting a broadcast agent webpage;
    receiving a broadcast request including a geographically defined broadcast target area, a broadcast message and one or more broadcast channel codes from the broadcast agent webpage;
    verifying an authority of a broadcast agent accessing the broadcast agent webpage and generating the broadcast message, the verifying the authority of the broadcast agent includes verifying an authority of the broadcast agent to transmit the broadcast message to the defined broadcast target area;
    determining which network providers have networks that provide service to at least a portion of the broadcast target area;
    converting the broadcast target area to network addresses of one or more network transmission devices for one or more of the determined network providers, said converting including determining the network transmission devices providing transmission service to at least a portion of the broadcast target area and identifying a network address for each determined network transmission device; and
    transmitting the broadcast message to the network addresses of the determined network transmission devices of the associated network providers for transmission of the broadcast message over broadcast channels associated with the one or more broadcast channel codes to user receiving devices geographically located within a transmission service area of the determined network transmission devices providing transmission service to at least a portion of the broadcast target area and that are configured for receiving messages on the associated broadcast channels.

16. The method of claim 15, further comprising transmitting the broadcast request to a carrier broadcast server that transmits the broadcast request to network interfaces of the determined network providers.

17. The method of claim 15 wherein the one or more network transmission devices and the determined network transmission devices are wireless transmitters within a wireless mobile network having a plurality of individual wireless cell sites each wireless transmitter serving a geographic serving area and wherein the geographic serving areas of the network transmission devices are the individual wireless sites served by the wireless transmitters and wherein the user receiving devices are wireless telephone receiving devices.

18. The method of claim 15 wherein verifying includes verifying the authority as a function of the one or more broadcast channel codes of the broadcast request.

19. The method of claim 15, further comprising receiving the broadcast message and the one or more broadcast channel codes at one of the network transmission devices identified by one of the network addresses and transmitting the broadcast message over a broadcast channel associated with the received one or more broadcast channel codes.

20. The method of claim 19, further comprising receiving the broadcast message by a user receiving device from one of the determined network transmission devices only when the user receiving device has activated the broadcast channel associated with the one or more broadcast channel codes.

* * * * *